(12) United States Patent  (10) Patent No.: US 9,013,626 B2
Nakata  (45) Date of Patent: Apr. 21, 2015

(54) SIGNAL PROCESSING CIRCUIT OF SOLID-STATE IMAGING ELEMENT, SIGNAL PROCESSING METHOD OF SOLID-STATE IMAGING ELEMENT, AND ELECTRONIC APPARATUS

(71) Applicant: Sony Corporation, Tokyo (JP)

(72) Inventor: Masashi Nakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 13/673,241

(22) Filed: Nov. 9, 2012

(65) Prior Publication Data

US 2013/0135504 A1  May 30, 2013

(30) Foreign Application Priority Data

Nov. 25, 2011 (JP) ................. 2011-257335

(51) Int. Cl.
  *H04N 5/238* (2006.01)
  *H04N 5/335* (2011.01)
  *H04N 5/355* (2011.01)
  *H04N 5/262* (2006.01)

(52) U.S. Cl.
  CPC ........... *H04N 5/335* (2013.01); *H04N 5/35554* (2013.01)

(58) Field of Classification Search
  CPC .................................................. H04N 5/2355
  USPC .......... 348/367; 358/448, 450, 452, 453, 465, 358/909.1; 382/284
  See application file for complete search history.

(56) References Cited

U.S. PATENT DOCUMENTS

| 2003/0021488 A1* | 1/2003 | Shaw et al. .................... 382/260 |
| 2003/0128893 A1* | 7/2003 | Castorina et al. ............. 382/284 |
| 2009/0268963 A1* | 10/2009 | Kang et al. ..................... 382/168 |
| 2010/0194933 A1* | 8/2010 | Sasaki ........................... 348/241 |

FOREIGN PATENT DOCUMENTS

JP  2004-266347  9/2004

* cited by examiner

*Primary Examiner* — Christopher K Peterson
(74) *Attorney, Agent, or Firm* — Sony Corporation

(57) ABSTRACT

A signal processing circuit of a solid-state imaging element which processes a signal of the solid-state imaging element having a first pixel group and a second pixel group in which a charge accumulation time or photosensitivity is different by α times from that of the first pixel group, includes a calculation unit that multiplies a signal value of a pixel of interest in the first pixel group by α times, a weighting unit that performs weighting with respect to the signal value of the pixel of interest based on a signal value of a pixel associated with the pixel of interest, and a synthesis unit that synthesizes the signal value which has been multiplied by α times in the calculation unit and on which the weighting has been performed in the weighting unit and a signal value of a pixel of the second pixel group.

15 Claims, 19 Drawing Sheets

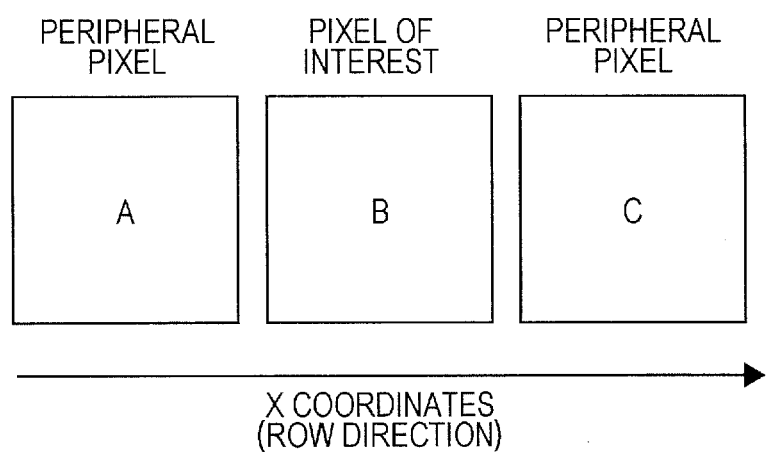
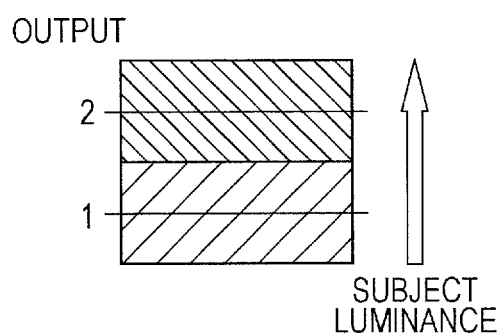
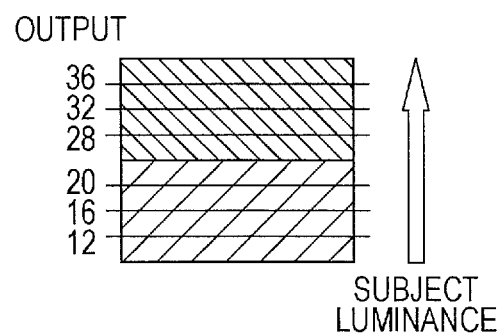

FIG. 8A

| 6 | 7 | 8 | 7 | 6 |
|---|---|---|---|---|
| 6 | 7 | 8 | 7 | 6 |
| 6 | 7 | 8 | 7 | 6 |
| 6 | 7 | 8 | 7 | 6 |
| 6 | 7 | 8 | 7 | 6 |

FIG. 8B

| 1 | 2 | 2 | 2 | 1 |
|---|---|---|---|---|
| 1 | 2 | 2 | 2 | 1 |
| 1 | 2 | 2 | 2 | 1 |
| 1 | 2 | 2 | 2 | 1 |
| 1 | 2 | 2 | 2 | 1 |

FIG. 8C

| 16 | 32 | 32 | 32 | 16 |
|----|----|----|----|----|
| 16 | 32 | 32 | 32 | 16 |
| 16 | 32 | 32 | 32 | 16 |
| 16 | 32 | 32 | 32 | 16 |
| 16 | 32 | 32 | 32 | 16 |

FIG. 8D

| 16 | 27 | 32 | 27 | 16 |
|----|----|----|----|----|
| 16 | 27 | 32 | 27 | 16 |
| 16 | 27 | 32 | 27 | 16 |
| 16 | 27 | 32 | 27 | 16 |
| 16 | 27 | 32 | 27 | 16 |

FIG. 10A

| 6 | 6 | 15 | 6 | 6 |
|---|---|----|---|---|
| 6 | 6 | 15 | 6 | 6 |
| 6 | 6 | 15 | 6 | 6 |
| 6 | 6 | 15 | 6 | 6 |
| 6 | 6 | 15 | 6 | 6 |

FIG. 10B

| 1 | 1 | 10 | 1 | 1 |
|---|---|----|---|---|
| 1 | 1 | 10 | 1 | 1 |
| 1 | 1 | 10 | 1 | 1 |
| 1 | 1 | 10 | 1 | 1 |
| 1 | 1 | 10 | 1 | 1 |

FIG. 10C

| 16 | 16 | 160 | 16 | 16 |
|----|----|-----|----|----|
| 16 | 16 | 160 | 16 | 16 |
| 16 | 16 | 160 | 16 | 16 |
| 16 | 16 | 160 | 16 | 16 |
| 16 | 16 | 160 | 16 | 16 |

FIG. 10D

| 16 | 64 | 64 | 64 | 16 |
|----|----|----|----|----|
| 16 | 64 | 64 | 64 | 16 |
| 16 | 64 | 64 | 64 | 16 |
| 16 | 64 | 64 | 64 | 16 |
| 16 | 64 | 64 | 64 | 16 |

FIG. 12A

| 6 | 7 | 8 | 7 | 6 |
|---|---|---|---|---|
| 6 | 7 | 8 | 7 | 6 |
| 6 | 7 | 8 | 7 | 6 |
| 6 | 7 | 8 | 7 | 6 |
| 6 | 7 | 8 | 7 | 6 |

FIG. 12B

| 1 | 2 | 2 | 2 | 1 |
|---|---|---|---|---|
| 1 | 2 | 2 | 2 | 1 |
| 1 | 2 | 2 | 2 | 1 |
| 1 | 2 | 2 | 2 | 1 |
| 1 | 2 | 2 | 2 | 1 |

FIG. 12C

| 16 | 32 | 32 | 32 | 16 |
|----|----|----|----|----|
| 16 | 32 | 32 | 32 | 16 |
| 16 | 32 | 32 | 32 | 16 |
| 16 | 32 | 32 | 32 | 16 |
| 16 | 32 | 32 | 32 | 16 |

FIG. 12D

| 16 | 27 | 32 | 27 | 16 |
|----|----|----|----|----|
| 16 | 27 | 32 | 27 | 16 |
| 16 | 27 | 32 | 27 | 16 |
| 16 | 27 | 32 | 27 | 16 |
| 16 | 27 | 32 | 27 | 16 |

FIG. 14A

| 6 | 6 | 15 | 6 | 6 |
|---|---|----|---|---|
| 6 | 6 | 15 | 6 | 6 |
| 6 | 6 | 15 | 6 | 6 |
| 6 | 6 | 15 | 6 | 6 |
| 6 | 6 | 15 | 6 | 6 |

FIG. 14B

| 1 | 1 | 10 | 1 | 1 |
|---|---|----|---|---|
| 1 | 1 | 10 | 1 | 1 |
| 1 | 1 | 10 | 1 | 1 |
| 1 | 1 | 10 | 1 | 1 |
| 1 | 1 | 10 | 1 | 1 |

FIG. 14C

| 16 | 16 | 160 | 16 | 16 |
|----|----|-----|----|----|
| 16 | 16 | 160 | 16 | 16 |
| 16 | 16 | 160 | 16 | 16 |
| 16 | 16 | 160 | 16 | 16 |
| 16 | 16 | 160 | 16 | 16 |

FIG. 14D

| 16 | 20 | 156 | 20 | 16 |
|----|----|-----|----|----|
| 16 | 20 | 156 | 20 | 16 |
| 16 | 20 | 156 | 20 | 16 |
| 16 | 20 | 156 | 20 | 16 |
| 16 | 20 | 156 | 20 | 16 |

SIGNAL PROCESSING CIRCUIT OF SOLID-STATE IMAGING ELEMENT, SIGNAL PROCESSING METHOD OF SOLID-STATE IMAGING ELEMENT, AND ELECTRONIC APPARATUS

BACKGROUND

The present disclosure relates to a signal processing circuit of a solid-state imaging element, a signal processing method of a solid-state imaging element, and an electronic apparatus.

In a solid-state imaging element, an output signal which is almost linear with respect to the amount of charge accumulated by photoelectric conversion may be obtained from a unit pixel. A dynamic range of the solid-state imaging element is determined primarily by the amount of charge (amount of saturated charge) capable of accumulating the unit pixel and a noise level. That is, the lower limit of an output level of the solid-state imaging element is restricted by the noise level, and the upper limit thereof is restricted by the saturation level. As a result, the dynamic range of the solid-state imaging element is determined primarily by the amount of saturated charge and the noise level.

As a method for expanding the dynamic range, it is widely used of synthesizing an image which is imaged by charge accumulation for a long time and of which a low luminance portion is relatively clear, and an image which is imaged by charge accumulation for a short time and of which a high luminance portion is relatively clear. As one technologies in the related art, which realizes a wide dynamic range, a technology in which a plurality of image signals with different exposure times are input, and the input signals are weighted by a value which is determined primarily has been used (for example, Japanese Unexamined Patent Application Publication No. 2004-266347).

SUMMARY

In the technology of the related art disclosed in Japanese Unexamined Patent Application Publication No. 2004-266347, an input signal is weighted by a value which is determined primarily in order to reduce the number of bits for signal processing. Accordingly, it is difficult to display original luminance information of a subject with high gradability.

It is desirable to provide a signal processing circuit and method of a solid-state imaging element which may display original luminance information of a subject in order to realize a wide dynamic range with high gradability, and an electronic apparatus having the signal processing circuit.

According to an embodiment of the preset disclosure, there is provided a signal processing circuit of a solid-state imaging element having a first pixel group and a second pixel group in which a charge accumulation time or photosensitivity is different by α times from that of the first pixel group, and the signal processing circuit has a configuration in which a signal value of a pixel of interest in the first pixel group is multiplied by α times, and weighting is performed with respect to the signal value of the pixel of interest based on a signal value of a pixel associated with the pixel of interest when synthesizing the signal value of the pixel of interest and a signal value of a pixel of the second pixel group.

Each pixel of the first pixel group is a pixel with a relatively short charge accumulation time or a pixel with relatively low photosensitivity. Each pixel of the second pixel group is a pixel with a charge accumulation time α times longer than each pixel of the first pixel group, or a pixel with photosensitivity α times higher than each pixel of the first pixel group.

To realize a wide dynamic range, the signal value of the pixel of interest in the first pixel group is multiplied by α times, and the multiplied signal value and the signal value of the pixel of the second pixel group are synthesized, but at this time, weighting is performed with respect to the signal value of the pixel of interest based on the signal value of the pixel associated with the pixel of interest. Through this weighting, unnatural gradation which shows a stepwise variance corresponding to the difference α in magnification between each pixel of the first pixel group and each pixel of the second pixel group may be alleviated.

According to the present disclosure, since unnatural gradation in which a stepwise variance corresponding to a magnification ratio difference α between each pixel of a first pixel group and each pixel of a second pixel group is inscribed may be alleviated, it is possible to represent original luminance information of a subject, with high gradability.

BRIEF DESCRIPTION OF THE DRAWINGS

FIG. 6 is a drawing showing a relationship between a pixel B of interest in a case of a weighting process related to Example 1 of the present disclosure and pixels A and C associated with the pixel B of interest;

FIGS. 7A and 7B are drawings showing a luminance level and an output image when a weighting process related to Example 1 of the present disclosure is performed;

FIGS. 8A to 8D are drawings showing a signal value of a pixel signal obtainable when using a noise reduction technique;

FIGS. 10A to 10D are drawings showing a signal value of a pixel signal obtainable when using a noise reduction technique with respect to a subject including a fine edge;

FIGS. 12A to 12D are drawings showing a signal value of a pixel signal obtainable when a weighting process related to Example 1 of the present disclosure is applied;

FIGS. 14A to 14D are drawings showing a signal value of a pixel signal obtainable when a weighting process related to Example 1 of the present disclosure is performed with respect to a subject including a fine edge;

DETAILED DESCRIPTION OF EMBODIMENTS

Figure 1:
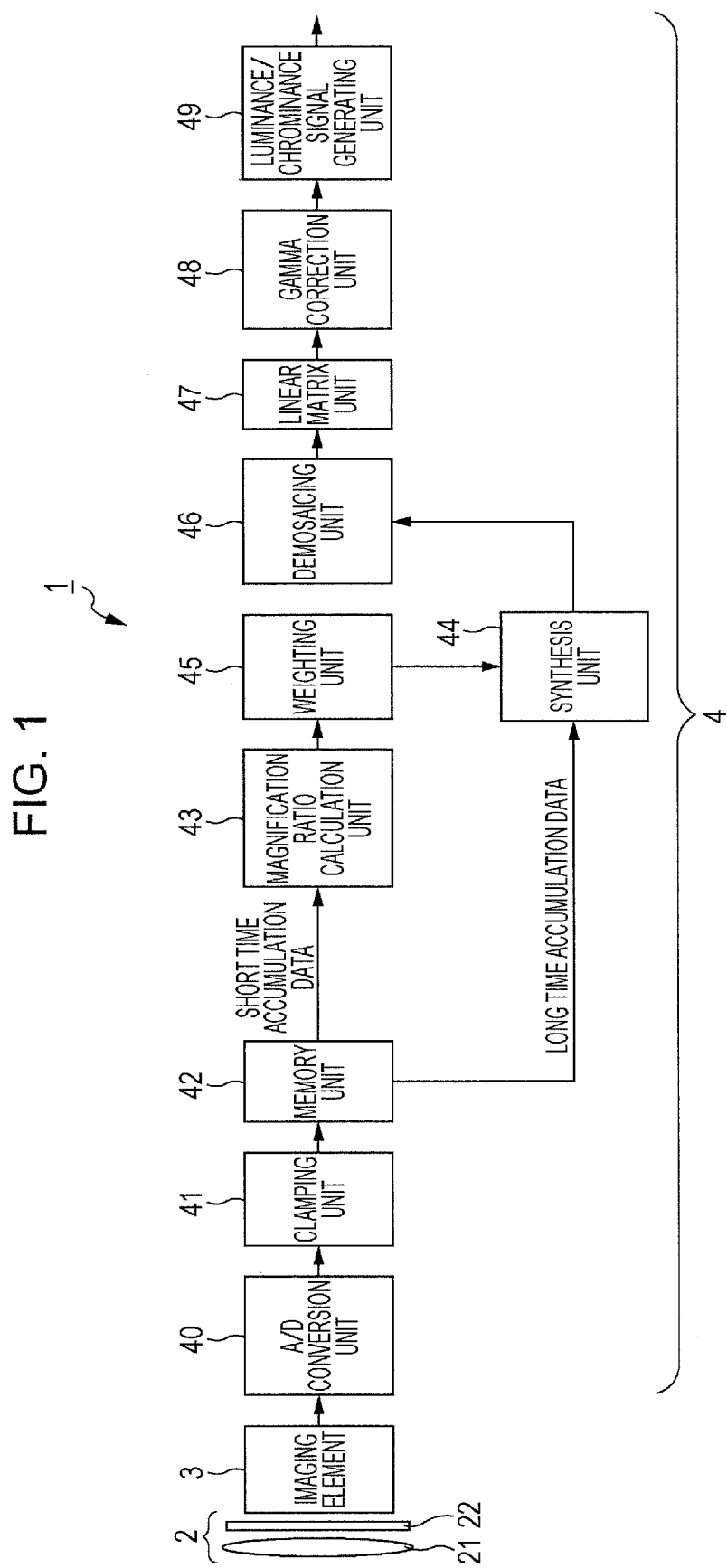
FIG. 1 is a block diagram showing an example of a configuration of an imaging apparatus having a signal processing circuit according to an embodiment of the present disclosure.

Hereinafter, embodiments for implementing techniques of the present disclosure (hereinafter, referred to as "embodiments") will be described with reference to the accompanying drawings. The present disclosure is not limited to the embodiments, and a variety of conditions, numeral values, and the like according to the embodiments are illustrated. In the following descriptions, the same reference numerals are applied to the same elements or elements having the same functions, and repeated description will be omitted. The descriptions will be made in the following order.
1. General description for signal processing circuit of solid-state imaging element, signal processing method, and electronic apparatus of the present disclosure
2. Examples
2-1. Example 1 (example of weighting process using two adjacent pixels on left and right sides as peripheral pixel)
2-2. Example 2 (example of weighting process using four adjacent pixels on upper, lower, left and right sides as peripheral pixel)
2-3. Example 3 (example of weighting process due to inclination change)
2-4. Example 4 (example of weighting process due to temporal change)
2-5. Specific circuit example of weighting unit
2-6. Arrangement example of each pixel of long time accumulation/short time accumulation
3. Modified example/Application example
4. Configuration of present disclosure

1. General Description for Signal Processing Circuit of Solid-State Imaging Element, Signal Processing Method, and Electronic Apparatus of the Present Disclosure As examples of a solid-state imaging element that is a processing target of a signal processing circuit or a signal processing method according to the present disclosure, an XY address type imaging element representing by a Complementary Metal Oxide Semiconductor (CMOS) image sensor, a charge transfer type imaging element represented by a Charge Coupled Device (CCD) image sensor, or the like may be given. The signal processing circuit of the present disclosure may be integrated on the same substrate (chip) as that of the solid-state imaging element, or may be provided outside the substrate.

The solid-state imaging element has a first pixel group and a second pixel group in which the charge accumulation time or photosensitivity are different by $\alpha$ times from that of the first pixel group. Each pixel of the first pixel group is a pixel with a relatively short charge accumulation time or a pixel with a relatively low photosensitivity. Each pixel of the second pixel group is a pixel with a charge accumulation time $\alpha$ times longer than each pixel of the first pixel group, or a pixel with photosensitivity $\alpha$ times higher than each pixel of the first pixel group. Hereinafter, to simplify the description, each pixel of the first pixel group is referred to as a short time accumulation pixel and each pixel of the second pixel group is referred to as a long time accumulation pixel.

In the signal processing circuit or the signal processing method of the present disclosure, the signal value of a pixel of interest in the first pixel group is multiplied by a times, and the multiplied signal value of the pixel of interest is synthesized with the signal value of a pixel of the second pixel group, thereby realizing a wide dynamic range of the solid-state imaging element. In the realization of the wide dynamic range, weighting is performed with respect to the signal value of the pixel of interest based on a signal value of a pixel associated with the pixel of interest, and the signal value on which the weighting is performed and the signal value of the pixel of the second pixel group are synthesized.

As the pixel associated with the pixel of interest, a peripheral pixel of the pixel of interest, which is positionally (coordinately) different from the pixel of interest, may be used. Here, the "peripheral pixel which is positionally different from the pixel of interest" may be a pixel laterally adjacent to the pixel of interest in the same pixel row, a pixel vertically adjacent to the pixel of interest in the same pixel column, a pixel obliquely adjacent to the pixel of interest, or the like.

In this instance, the peripheral pixel is not limited to two pixels on the left and right sides of the pixel of interest in the same pixel row, or two pixels above and below the pixel of interest in the same pixel column. That is, a plurality of pixels on the left and right sides of the pixel of interest in the same pixel row may be used as the peripheral pixels, and a plurality of pixels above and below the pixel of interest in the same pixel column may be used as the peripheral pixels.

In addition, weighting may not be performed using signal values of the peripheral pixels of the pixel of interest as it is, but the weighting may be performed from a tendency of, for example, adjacent pixels before and after the pixel of interest. Specifically, from the tendency of the adjacent pixels before and after the pixel of interest, that is, from a tendency (inclination) of a difference in the amount of change of signal values of the adjacent pixels, the signal values of the adjacent pixels before and after the pixel of interest are estimated, and the weighting may be performed using the estimation value. To see the tendency of the adjacent pixels before and after the pixel of interest, signal values of a plurality of pixels which are coordinately consecutive with respect to the adjacent pixels before and after the pixel of interest may be used.

Otherwise, as the pixel associated with the pixel of interest, a pixel with the same coordinates as those of the pixel of interest, which is temporally different from the pixel of interest may be used. Here, the "pixel with the same coordinates as those of the pixel of interest, which is temporally different from the pixel of interest" is a pixel (positionally (coordinately) the same pixel) with the same coordinates (the same position) as those of the pixel of interest in an imaging frame which is different from that of the pixel of interest.

When the pixel associated with the pixel of interest is a peripheral pixel which is positionally different from the pixel of interest, or is a pixel with the same coordinates as those of the pixel of interest, which is temporally different from the pixel of interest, such a pixel is preferably a pixel with the same color as that of the pixel of interest. However, a pixel with a different color from that of the pixel of interest is not excluded.

When the weighting is performed with respect to the signal value of the pixel of interest based on the signal value of the pixel associated with the pixel of interest, the weighting is preferably performed by a weighting value (strength) within a range of $\pm(\alpha/2)$, and the weighting is more preferably performed by a weighting value of $\pm(\alpha/4)$.

In performing the weighting process, the signal value of the pixel of interest and the signal value of the pixel associated with the pixel of interest are compared, and the weighting value is added to or subtracted from the signal value of the pixel of interest within the range of $\pm(\alpha/2)$ based on the comparison result. In this instance, when the signal value of the pixel associated with the pixel of interest is greater than the signal value of the pixel of interest, the addition may be performed, and when the signal value of the pixel associated with the pixel of interest is smaller than the signal value of the pixel of interest, the subtraction may be performed. When the pixel associated with the pixel of interest is a peripheral pixel of the pixel of interest, it is preferable that the signal value of the pixel of interest and an average value of a plurality of peripheral pixels be compared.

In addition, as for the weighting process, a plurality of threshold values are set with respect to a difference between the signal value of the pixel of interest and the signal value of the pixel associated with the pixel of interest, and the weighting values different for each of the plurality of threshold values may be added to or subtracted from the signal value of the pixel of interest.

The weighting unit for performing the weighting process may include a difference calculation unit, a memory unit, and an addition/subtraction unit. Here, the difference calculation unit obtains a difference between the signal value of the pixel associated with the pixel of interest and the signal value of the pixel of interest. The memory unit stores in advance a plurality of weighting values corresponding to the difference between the signal value of the pixel associated with the pixel of interest and the signal value of the pixel of interest. The addition/subtraction unit obtains, from the memory unit, the weighting value corresponding to a difference obtained by the difference calculation unit, and adds or subtracts the obtained weighting value to or from the signal value of the pixel of interest.

The signal processing circuit and the signal processing method of the present disclosure may be used as a signal processing circuit or a signal processing method of an imaging element in an imaging apparatus (a camera system) such as a digital still camera, a video camera, or the like. In addition, the signal processing circuit or the signal processing method of the present disclosure are not limited to the application to the imaging apparatus, and may be applicable in portable information terminals having an imaging function such as a mobile phone, or electronic apparatuses in which a solid-state imaging element is used in an image acquisition unit (an imaging unit) such as a copier, a facsimile machine, or the like. In addition, using the solid-state imaging element in the image acquisition unit, the electronic apparatus using the signal processing circuit or the signal processing method of the present disclosure as the signal processing circuit or the signal processing method of the solid-state imaging element is an electronic apparatus of the present disclosure.

2. Embodiments

FIG. 1 is a block diagram showing an example of a configuration of an imaging apparatus having a signal processing circuit according to an embodiment of the present disclosure. As examples of the imaging apparatus, a digital still camera, a video camera, or the like may be given.

In FIG. 1, the imaging apparatus 1 includes an optical system 2 having an imaging lens 21 or an aperture 22, a solid-state imaging element 3, and the signal processing circuit 4 according to the present embodiment. In the present example, a configuration in which the signal processing circuit 4 is disposed outside a chip of the solid-state imaging element 3 to be used is shown, but a configuration in which the signal processing circuit 4 is integrated on the same chip as that of the solid-state imaging element 3 may be used.

The optical system 2 forms image light from a subject image on an imaging surface of the solid-state imaging element 3. The solid-state imaging element 3 is, for example, a CMOS image sensor, and a plurality of unit pixels (hereinafter, simply referred to as "pixel") are two-dimensionally arranged in a matrix form. The solid-state imaging element 3 is not limited to the CMOS image sensor. In each of the unit pixels, a color filter is provided by, for example, a Bayer array. A color array of the color filter is not limited to the Bayer array.

The solid-state imaging element 3 has a pixel group (a first pixel group) of short time accumulation pixels each having a relatively short charge accumulation time (an exposure time), and a pixel group (a second pixel group) of longer time accumulation pixels each having a longer accumulation time by $\alpha$ times than the short time accumulation pixel. In the solid-state imaging element 3, a control of the accumulation time of signal charge of each pixel is performed under driving by a peripheral circuit (a timing generator, a vertical scanning unit, or the like) for driving each pixel. A signal of the short time accumulation pixel and a signal of the long time accumulation pixel which are output from the solid-state imaging element 3 are supplied to the signal processing circuit 4 according to the present embodiment.

The signal processing circuit 4 according to the present embodiment includes an A/D conversion unit 40, a clamping unit 41, a memory unit 42, a magnification ratio calculation unit 43, a synthesis unit 44, a weighting unit 45, a demosaicing unit 46, a linear matrix unit 47, a gamma correction unit 48, and a luminance/chroma signal generating unit 49.

The signals of the short accumulation pixel and the long accumulation pixel output from the solid-state imaging element 3 are converted from analog signals to digital signals in the A/D conversion unit 40. Hereinafter, the signal of the short time accumulation pixel output from the A/D conversion unit 40 is referred to as short time accumulation data, and the signal of the long time accumulation pixel is referred to as long time accumulation data.

Such data indicates each signal value of the short time accumulation pixel and the long time accumulation pixel, and is supplied to the memory unit 42 after being subjected to a correction process of a black level in the clamping unit 41. Here, when the solid-state imaging element 3 includes the A/D conversion unit built therein, the A/D conversion unit 40 is not necessary.

The memory unit 42 includes, for example, a frame memory, and stores the input short and long time accumulation data in a unit of rows (lines) of a pixel array formed in a matrix shape, or in a unit of frames. The memory unit 42 has a memory controller (not shown) for controlling the frame memory, and performs writing and reading of the short time accumulation data and the long time accumulation data for the frame memory under a control by the memory controller.

The short time accumulation data and the long time accumulation data which are synthesized to realize a wide dynamic range are read in pairs from the memory unit 42. The short time accumulation data read from the memory unit 42 is supplied to the magnification ratio calculation unit 43, and the long time accumulation data read from the memory unit 42 is supplied to the synthesis unit 44.

The short time accumulation data supplied to the magnification calculation unit 43 is subjected to a calculation process of $\alpha$ times in the magnification ratio calculation unit 43. Here, as described above, the "$\alpha$ times" is a magnification ratio difference in an accumulation time (an exposure time) between the long time accumulation pixel and the short time accumulation pixel, that is, the accumulation time of the long time accumulation pixel/the accumulation time of the short time accumulation pixel. By the calculation process of the magnification ratio calculation unit 43, correction of the magnification ratio difference of the accumulation time is performed with respect to the short time accumulation data.

The short time accumulation data which has been multiplied by $\alpha$ times in the magnification ratio calculation unit 43 is supplied to the weighting unit 45. The weighting unit 45 performs weighting on the short time accumulation data which has been multiplied by $\alpha$ times in the magnification ratio calculation unit 43 based on the signal value of the pixel associated with the pixel of interest with respect to the signal value of the pixel of interest, preferably, the signal value of the pixel with the same color as that of the pixel of interest. The weighting unit 45 is a key in the present embodiment, and detailed description thereof will be made below.

The short time accumulation data on which the weighting has been performed in the weighting unit 45 is supplied to the synthesis unit 44. The synthesis unit 44 synthesizes the long time accumulation data directly supplied from the memory unit 42 and the short time accumulation data on which the weighting has been performed in the weighting unit 45 to thereby be supplied. The synthesis unit 44 performs a synthesis process in which the long time accumulation data is replaced with the short time accumulation data when the long time accumulation pixel is saturated.

Pixel data after being subjected to the synthesis process in the synthesis unit 44 is subjected to a synchronization process in the demosaicing unit 46, is subjected to a color reproduction process in the linear matrix unit 47, is subjected to a gamma correction process in the gamma correction unit 48, and then is supplied to the luminance/chroma signal generating unit 49. Here, the data finally obtained is generated as a luminance signal and a chrominance signal the luminance/chroma signal generating unit 49, and then is output through a video interface (I/F) which is not shown.

In the signal processing circuit 4 according to the present embodiment having the above-described configuration, the relationship between the short time accumulation data and the long time accumulation data before and after the calculation of $\alpha$ times in the magnification ratio calculation unit 43 is as follows.

Before Magnification Ratio Calculation
Short time accumulation data: A [digit] (A being obtained signal value)
Long time accumulation data: B [digit] (B being obtained signal value)
After Magnification Ratio Calculation
Short time accumulation data: A×$\alpha$ [digit] (A being obtained signal value)
Long time accumulation data: B [digit] (B being obtained signal value)

Figure 2:
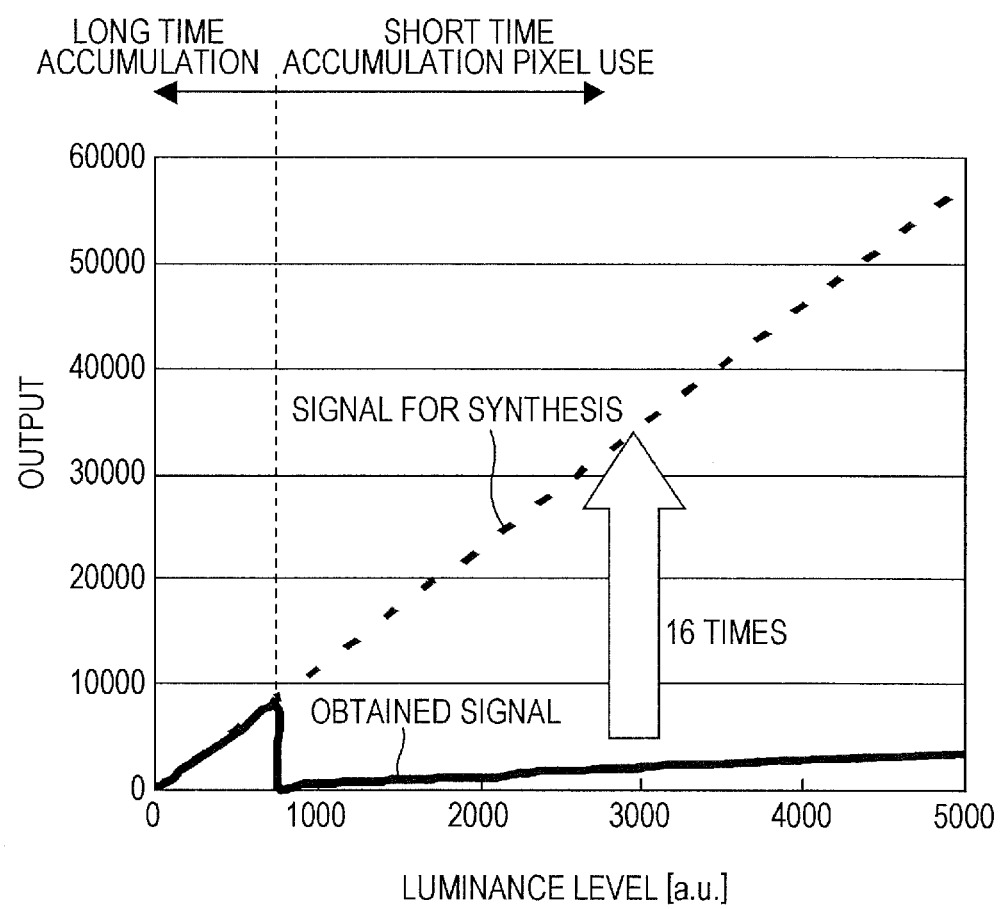
FIG. 2 is a drawing showing a concept when synthesizing long time accumulation data and short time accumulation data in order to realize a wide dynamic range.

Here, as an example, it is assumed that a difference of 16 times ($\alpha$=16) in the accumulation time between the long time accumulation pixel and the short time accumulation pixel is given. In this case, when synthesizing the long time accumulation data and the short time accumulation data, the short time accumulation data is multiplied by a gain of 16 times in the magnification ratio calculation unit 43, and then both data is synthesized in the synthesis unit 44, as shown in FIG. 2.

A signal value obtainable by the synthesis process is a signal value at a step (that is, a step) corresponding to a magnification ratio difference in a high luminance region such that the short time accumulation data is used, that is, a high luminance region such that the long time accumulation pixel is saturated, and when $\alpha$=16 is satisfied, the signal value obtainable by the synthesis is a signal value at 16 steps. In general, since the subject itself is difficult to have gradations of 16 steps, the signal value at 16 steps is a so-called estimation value.

Such a signal process is a signal process which carries a risk in terms of solarization in which gradation expression may not be sufficiently realized or a noise sensation. Here, the "solarization" is an image quality deterioration phenomenon in which resolution of an image signal is missing due to a lack of arithmetic accuracy in a camera signal process or the like, a level difference occurs when a consecutive luminance change in a subject having a gradation change may not be expressed, and these are two-dimensionally arranged and thereby seen as a pattern (outline).

Figure 3:
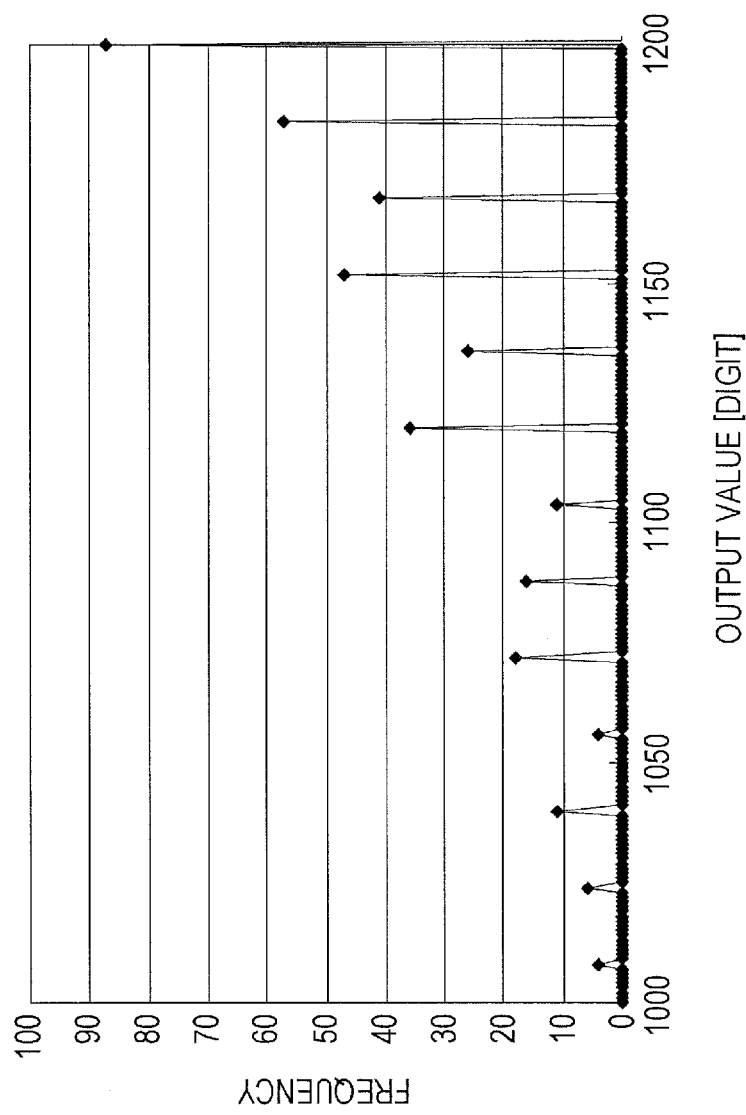
FIG. 3 is a drawing showing an example of a signal value obtainable when short time accumulation data is multiplied by 16 times.

As to the noise, even when an original noise level of "1" is multiplied by $\alpha$ times, a level difference of $\alpha$ occurs. When $\alpha$ is "16", the signal obtained in the synthesis process has a discrete value as shown in FIG. 3.

Figure 4A:
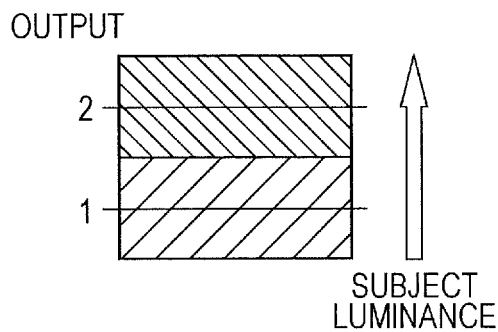
FIGS. 4A and 4B are drawings showing a luminance level and an output image when a weighting process is not performed with respect to short time accumulation data.
Figure 4B:
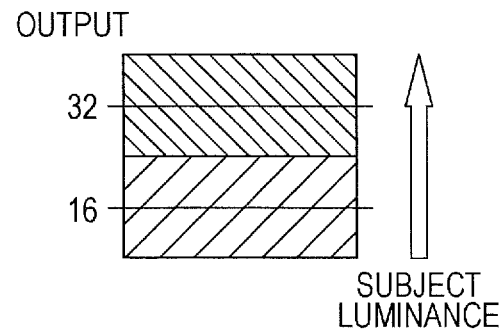

In FIGS. 4A and 4B, a luminance level and an output image when the weighting is not performed with respect to the short time accumulation data are shown. Short time accumulation data before a magnification ratio calculation is shown in FIG. 4A, and short time accumulation data after the magnification ratio calculation is shown in FIG. 4B.

As shown in FIG. 4A, even in a scene where the luminance level is gradually changed, a digital value may not be inscribed by only one step. When the digital value is subjected to a magnification ratio calculation, the digital value becomes a magnification ratio step (here, 16 times) instead of one step as shown in FIG. 4B. For example, outputs of 1 digital value and 2 digital value are changed to 16 digital value and 32 digital value. That is, a difference between the above two digital outputs is represented by 16 digital value (=32−16 digital value).

The signal processing circuit 4, more specifically, the weighting unit 5 of the present embodiment has an advantageous function of solving the above-described problem, that is, a function of eliminating an output state in which the signal obtainable by the synthesis process has only a discrete value.

Figure 5A:
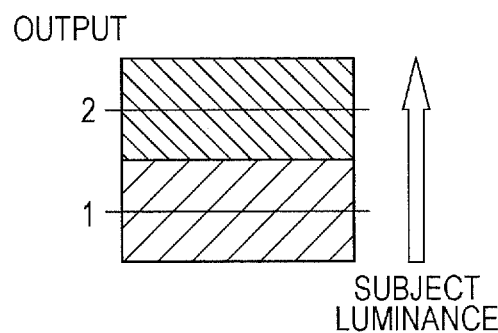
FIGS. 5A and 5B are drawings showing a luminance level and an output image when a weighting process according to an embodiment of the present disclosure is applied.
Figure 5B:
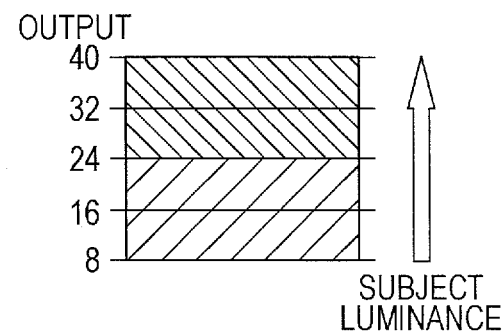

In the present embodiment, after a magnification ratio calculation of the magnification ratio calculation unit 43, weight is performed in the weighting unit 45, thereby reducing the difference. FIGS. 5A and 5B show a luminance level and an output image when the weighting according to the present embodiment is performed. Short time accumulation data before a magnification ratio calculation is shown in FIG. 5A, and the short time accumulation data after the magnification ratio calculation is shown in FIG. 5B.

First, since the digital value may not inscribe numerals equal to or less than "1", the obtainable output is 1 digital value and 2 digital value (when the obtainable output is 10 bits, transition in one step is made possible between "0" to "1023" of digital values, but numerals after a decimal point may not be obtained). Here, it may be difficult to reduce the difference.

Next, a magnification ratio calculation is performed in the magnification ratio calculation unit 43, and 1 digital value and 2 digital value are changed to 16 digital value and 32 digital value. After performing the magnification ratio calculation, a vacancy is generated in the representable digital value. That is, in a case of this example, 17 to 31 digital values may be maintained. The weighting is performed in the weighting unit 45.

1 digital value is obtained in such a manner that 0.5 to 1.5 digital values (a value that may not be actually obtained) are converged. 2 digital value is obtained in such a manner that 1.5 to 2.5 digital values (a value that may not be actually obtained) are converged. In this manner, as shown in FIG. 5B, when a value that is to be originally obtained is 1 digital value after the magnification ratio calculation (Here, 16 times), numerals between "8" to "24" of 16 times are obtained, and when the value is 2 digital value, numerals between "24" to "40" are obtained. Consequently, the output value may have numerals within a range of $\pm(\alpha/2)$ ($\alpha$ being a magnification ratio difference of accumulation times, in this case, within a range of ±8).

In this manner, the difference is reduced by the weighting performed in the weighting unit 45, and therefore, in a wide dynamic range, unnatural gradation having steps corresponding to a magnification ratio difference between a short time accumulation pixel and a long time accumulation pixel is alleviated thereby representing an image with higher gradability. That is, it is possible to represent original luminance information of a subject with high gradability. In other words, it is possible to more faithfully predict and reproduce an original state of the subject. Therefore, it is possible to more accurately perform a signal process after the weighting unit 45.

Based on a concept of the weighting process according to the present embodiment, specific examples of the weighting unit 45 will be described as below. In addition, in the imaging apparatus shown in FIG. 1, disposition locations of the weighting unit 45 according to the present embodiment are an example, and any portions may be possible as long as portions are on a signal processing path in which the weighting can be performed with respect to the short time accumulation data.

2-1. Example 1

In the weighting unit 45 related to Example 1, a peripheral pixel of the pixel of interest is used as a pixel associated with the pixel of interest. Specifically, as shown in FIG. 6, when a pixel B in a given pixel row is used as a pixel of interest, pixels A and C laterally adjacent to the pixel B of interest in the same pixel row are used as pixels associated with the pixel B of interest.

The weighting unit 45 performs weighting with respect to short time accumulation data (a signal value) after the magnification ratio calculation performed in the magnification ratio calculation unit 43, using signal values of the pixels A and C under the following condition. Hereinafter, for simplification of description, each signal value of the pixels A, B, and C are simply referred to as A, B, and C.
Process with Respect to Pixel B of Interest
when an average value (an intermediate value) of A and C is smaller than B: a value of B−"4" of a digital value
when an average value (an intermediate value) of A and C is greater than B: a value of B+"4" of a digital value
when an average value (an intermediate value) of A and C is the same as B: no weighting That is, here, a calculation is performed using a value of $\pm(\alpha/4)$ at the time of the weighting, but basically, it is preferable that the output value have numerals within a range of $\pm(\alpha/2)$. $\pm(\alpha/4)$ is a numeral for obtaining an intermediate point (an intermediate value) of $\pm(\alpha/2)$. By performing the weighting using the value of $\pm(\alpha/4)$, 1 digital value is subjected to a magnification ratio calculation and the weighting as shown in FIG. 7B, and then one of "12", "16", and "20" of digital values are obtained for 1 digital value, and one of "28", "32" and "36" of digital values are obtained for 2 digital value.

In FIGS. 7A and 7B, a luminance level and an output image when the weighting related to Example 1 is performed is shown. FIG. 7A shows short time accumulation data before the magnification ratio calculation, and FIG. 7B shows short time accumulation data after the magnification ratio calculation.

As to the weighting process related to Example 1, the weighting is performed based on signal values of the pixels A and C adjacent to the pixel B of interest in the same pixel row, and when realizing a wide dynamic range, unnatural gradation having a step (in the present example, a step) corresponding to a magnification ratio difference in an accumulation time between the short time accumulation pixel and the long time accumulation pixel is alleviated. As a result, it is possible to realize image representation with higher gradability.
Noise Reduction In the signal process of the solid-state imaging element, as a method for determining a numeral of a pixel of interest using signal values of peripheral pixels, a concept of noise reduction is used (for example, see Japanese Unexamined Patent Application Publication No. 2005-311455).

The noise reduction is a technique of removing noise sensation by smoothing noise within an arbitrary region, and by using this technique in realization of the wide dynamic range, it is possible to obtain the smoothed signal value, which is not a signal of a step of 16 digital value, as shown in FIGS. 8A to 8D even in a case of the solid-state imaging element having an exposure difference of 16 times.

Figure 9A:
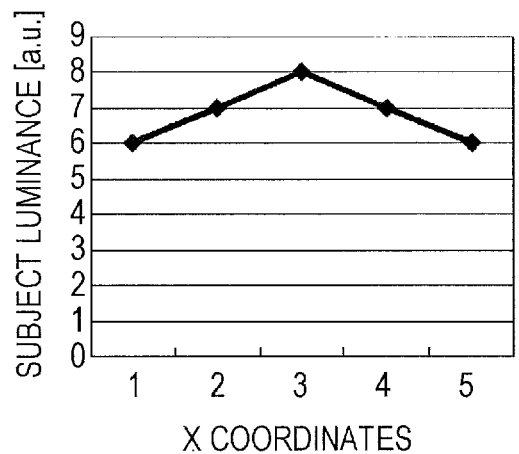
FIGS. 9A to 9D are graphs obtained by plotting the signal value of FIGS. 8A to 8D in a horizontal direction.
Figure 9B:
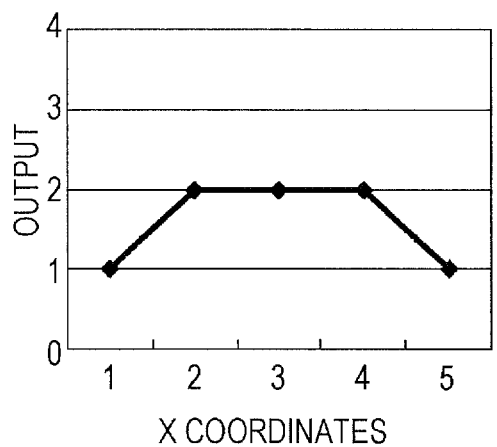
Figure 9C:
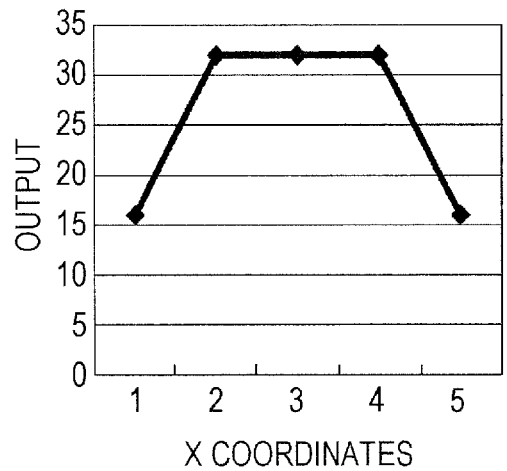
Figure 9D:
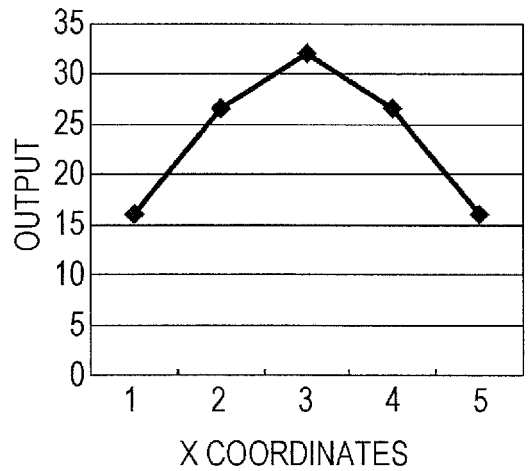
Figure 11A:
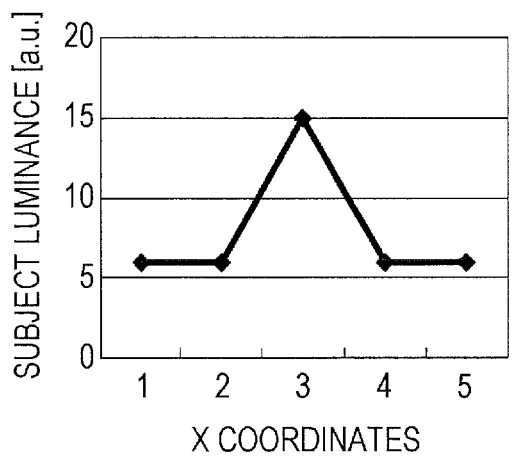
FIGS. 11A to 11D are graphs obtained by plotting the signal value of FIGS. 10A to 10D in a horizontal direction.
Figure 11B:
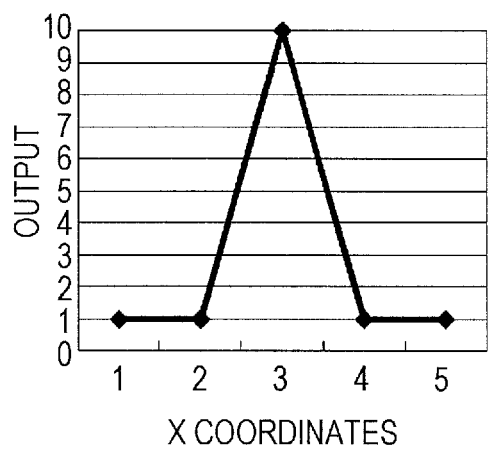
Figure 11C:
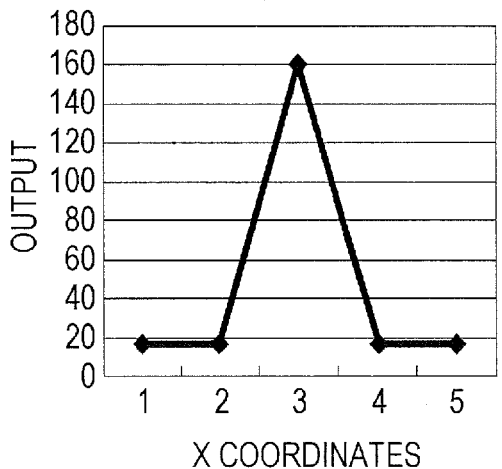
Figure 11D:
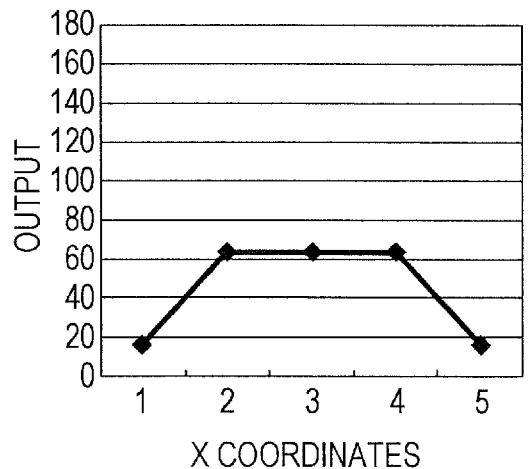

FIGS. 8A to 8D are drawings showing a signal value of a pixel signal obtainable when using the technique of the noise reduction. In addition, FIGS. 9A to 9D are graphs by plotting the signal values of FIGS. 8A to 8D in a horizontal direction. FIGS. 8A and 9A show luminance distribution of a subject, FIGS. 8B and 9B show signal values of short time accumulation pixel, FIGS. 8C and 9C show signal values after a magnification ratio calculation, and FIGS. 8D and 9D show signal values after a noise reduction.

As shown in FIG. 8A, the luminance level of a subject has a smooth luminance level. On the other hand, a signal value of a pixel signal obtainable in the short time accumulation pixel of a wide dynamic range is shown in FIG. 8B. First, at this point of time, fine gradation is collapsed. For example, when output data of the solid-state imaging element is 10 bits, the luminance level of the subject is used to be represented by "1" to "1023" of digital values. When the luminance level for representation is "0" to "10230", 1 digital value is increased for each of 10 steps of the luminance level.

Consequently, even though the luminance signal is a smooth analog value, the signal value is changed in a stepwise manner in a digital step. In this manner, the difference between a bit width and luminance gradation causes a collapse of gradation. In FIG. 8C, short time accumulation data is multiplied by a magnification ratio difference (in this example, 16 times) in accumulation times between long time accumulation and short time accumulation. This is a process for synthesizing the long time accumulation data and the short time accumulation data.

At this point of time, gradation remains collapsed. Furthermore, when a noise reduction process is added, FIG. 8D is obtained. There are many techniques for the noise reduction (smoothing), but here, an average value of three pixels which are laterally adjacent to the pixel of interest is used as a value after processing the pixel of interest. Therefore, it is possible to obtain gradation representation such as the original luminance level.

However, in a pattern (a subject) including a fine edge, the noise reduction process may be an adverse effect. For example, when a subject including an edge such as shown in FIG. 10A is present, a signal value of the short time accumulation pixel is obtained as shown in FIG. 10B. Furthermore, for synthesis in the realization of the wide dynamic range, FIG. 10C is obtained when multiplying a magnification ratio difference (in this example, 16 times) of the accumulation time.

Here, as described above, when an average value of three pixels including the pixel of interest and the peripheral pixels which are laterally adjacent to the pixel of interest is substituted with a value of the pixel of interest, FIG. 10D is obtained. As can be seen from FIG. 10D, the value of the edge is collapsed, and therefore even the values of the periphery become the output value such as in the edge. This is an adverse effect of the smoothing, that is, the noise reduction process. FIGS. 11A to 11D are graphs obtained by plotting the signal values of FIGS. 10A to 10D in a horizontal direction.

Specific Action and Effect Due to Weighting Process

By the weighting process related to Example 1, in addition to an action and effect capable of realizing image representation with a higher gradability than that in the described above, a specific action and effect which may not be obtained in the noise reduction process which will be described below may be obtained.

Figure 13A:
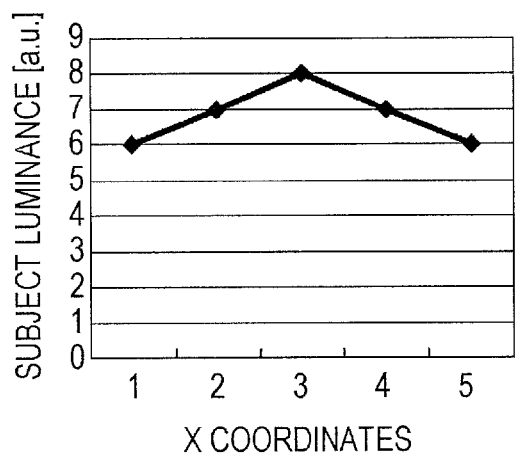
FIGS. 13A to 13D are graphs obtained by plotting a signal value of FIGS. 12A to 12D in a horizontal direction.
Figure 13B:
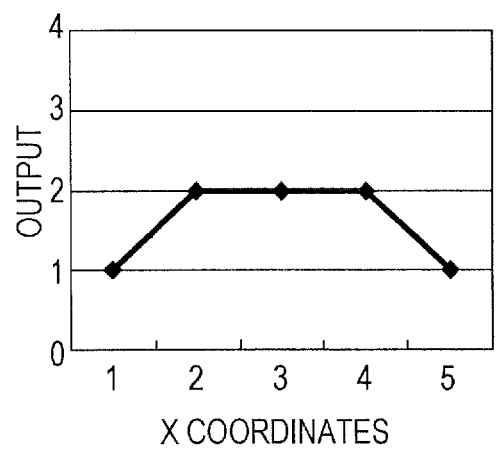
Figure 13C:
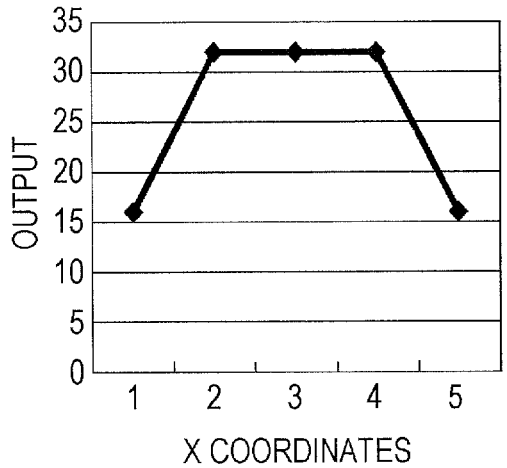
Figure 13D:
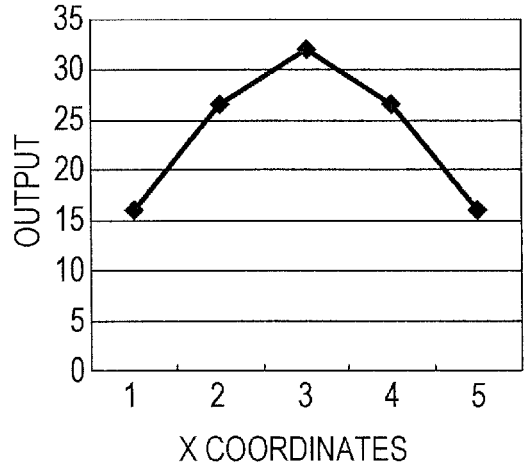

FIGS. 12A to 12D are drawings showing a signal value of a pixel signal obtainable when the weighting process related to Example 1 is applied. FIGS. 13A to 13D are graphs obtained by plotting the signal value of FIGS. 12A to 12D in a horizontal direction. FIGS. 12A and 13A show the luminance distribution of a subject, FIGS. 12B and 13B show a signal value of a short time accumulation pixel, FIGS. 12C and 13C show a signal value after a magnification ratio calculation, and FIGS. 12D and 13D show a signal value after weighting. In addition, FIGS. 12A to 12D and 13A to 13D respectively correspond to FIGS. 8A to 8D and FIGS. 9A to 9D.

As is apparent from the comparison between FIGS. 12A to 12D and FIGS. 13A to 13D and FIGS. 8A to 8D and FIGS. 9A to 9D, when a case in which the pattern including the fine edge is not present on the subject, a similar result as that of the noise reduction process (smoothing) may be obtained by the weighting process related to Example 1.

On the other hand, when the pattern (on the subject) including the fine edge is present, it is possible to eliminate the adverse effect in the noise reduction process by using the weighting process related to Example 1. That is, unlike the noise reduction process, since a signal value which a pixel can originally have is only predicted by the weighting process related to Example 1, a problem in which the edge is collapsed is not caused. This specific action and effect may be the same as those in Examples 2 to 4 which will be described below.

Figure 15A:
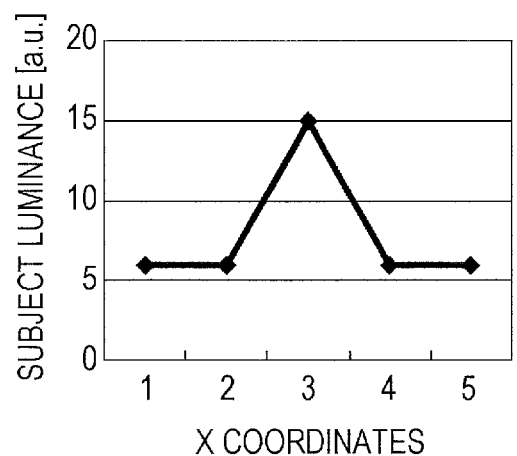
FIGS. 15A to 15D are drawings obtained by plotting a signal value of FIGS. 14A to 14D in a horizontal direction.
Figure 15B:
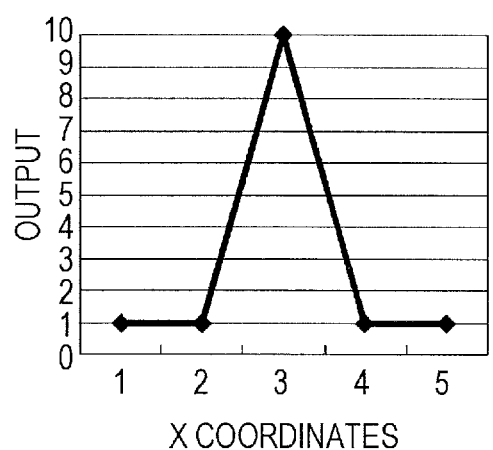
Figure 15C:
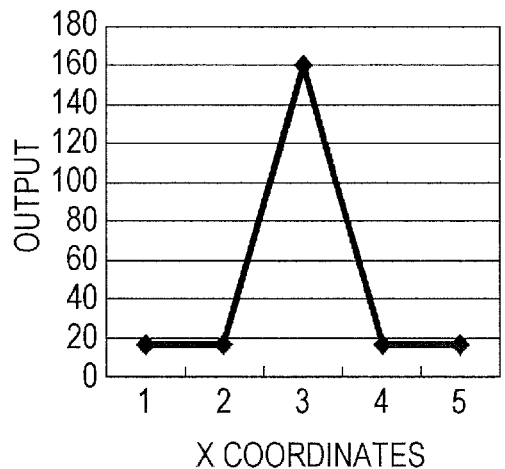
Figure 15D:
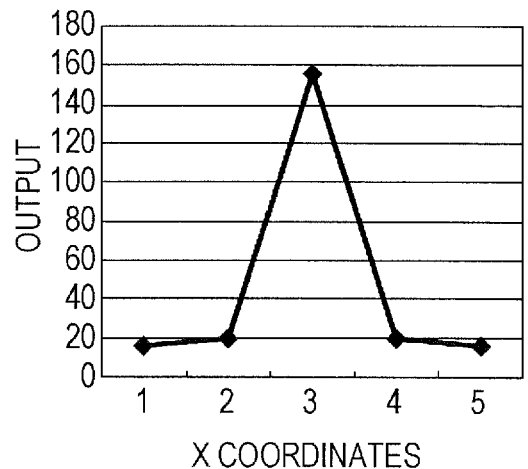

FIGS. 14A to 14D are drawings showing a signal value of a pixel signal obtainable when the weighting process related to Example 1 is applied to a subject including a fine edge. In addition, FIGS. 15A to 15D are graphs obtained by plotting the signal values of FIGS. 14A to 14D in a horizontal direction. FIGS. 14A and 15A show luminance distribution of a subject, FIGS. 14B and 15B show the signal value of a short time accumulation pixel, FIGS. 14C and 15C show a signal value after a magnification ratio calculation, and FIGS. 14D and 15D show a signal value after weighting. In addition, FIGS. 14A to 14D and FIGS. 15A to 15D respectively correspond to FIGS. 10A to 10D and FIGS. 11A to 11D.

As is apparent from the comparison between FIGS. 14D and 15D and FIGS. 10D and 11D, by the weighting process related to Example 1, the adverse effect in which the value of the edge in the pattern including the fine edge is collapsed is not generated. That is, a steep edge portion is collapsed due to the smoothing when using the noise reduction process, whereas a calculation is performed while limited to only a range of a value that an original pixel signal can have when using the weighting process related to Example 1, and therefore the adverse effect such that the edge portion is collapsed does not occur.

2-2. Example 2

Figure 16:
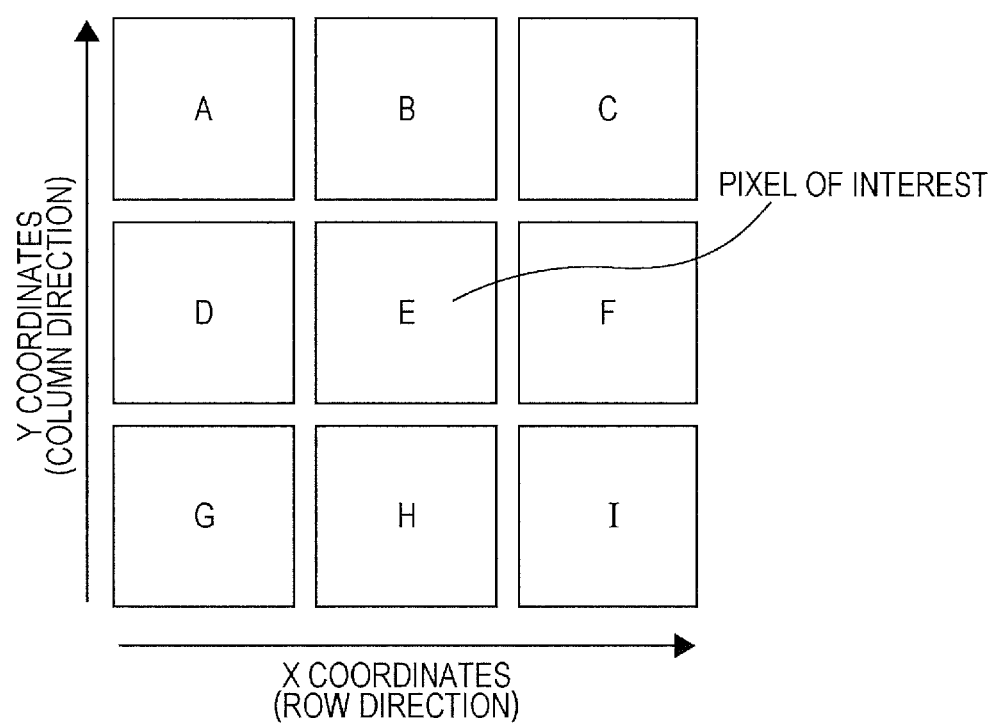
FIG. 16 is a drawing showing a relationship between a pixel E of interest in a case of a weighting process according to Example 2 of the present disclosure and pixels B, H, D, and F associated with the pixel of interest E.

In the weighting unit 45 related to Example 2, when a pixel E in a given pixel row is used as a pixel of interest, in a pixel array shown in FIG. 16, pixels D and F which are laterally adjacent to the pixel E of interest in the same pixel row and pixels B and H which are vertically adjacent to the pixel of interest in the same pixel row may be used as pixels associated with the pixel of interest.

The weighting unit 45 performs a weighting process with respect to short time accumulation data (a signal value) after the magnification ratio calculation performed in the magnification ratio calculation unit 43, using signal values of the peripheral pixels D, F, B, and H under the following condition. Hereinafter, for simplification of description, the signal values of the pixels B, D, E, F, and H are simply referred to as B, D, E, F, and H.

Process with Respect to Pixel E of Interest (1) When average value (intermediate value) of D and F is smaller than E, and when average value (intermediate value) of B and H is smaller than E: value of E–"6" of digital value (2) When average value (intermediate value) of D and F is greater than E, and when average value (intermediate value) of B and H is greater than E: value of E+"6" of digital value (3) When average value (intermediate value) of D and F is smaller than E, and when average value (intermediate value) of B and H is the same output as that of E: value of B–"4" of digital value (4) When average value (intermediate value) of D and F is greater than E, and when average value (intermediate value) of B and H is the same output as that of E: value of B+"4" of digital value (5) When average value (intermediate value) of D and F is smaller than E, when average value (intermediate value) of B and H is greater than E, and when average value (intermediate value) of D, F, B, and H is smaller than E: value of B–"2" of digital value (6) When average value (intermediate value) of D and F is smaller than B, when average value (intermediate value) of B and H is greater than E, and when average value (intermediate value) of D, F, B, and H is greater than E: value of B+"2" of digital value (7) When average value (intermediate value) of D and F is greater than B, when average value (intermediate value) of B and H is smaller than E, and when average value (intermediate value) of D, F, B, and H is smaller than E: value of B–"2" of digital value (8) When average value (intermediate value) of D and F is greater than B, when average value (intermediate value) of B and H is smaller than E, and when average value (intermediate value) of D, F, B, and H is greater than E: value of B+"2" of digital value By applying the conditions of (1) to (8) described above, 1 digital value may have one of "10", "12", "14", "16", "18", "20", and "22" after being subjected to the magnification ratio calculation (16 times) and the weighting. Consequently, in the realization of the wide dynamic range in the related art, "1" of an output is simply multiplied by a times (16 times) to thereby be determined primarily to "16", but in the present technology, it is possible to have numerals within a range of ±(α/2) from values of the peripheral pixels.

In the above Example, the signal values of four pixels which are laterally and vertically adjacent to the pixel of interest as the peripheral pixels are used, but signal values of four pixels which are obliquely adjacent to the pixel of interest may be used in addition to these four adjacent pixels. In addition, in the above Example, a digital value for adding/subtracting the signal values is determined by comparing only the magnitude of the signal values, but a threshold value is set based on, for example, an average value of the peripheral pixels, or the like, and therefore the value may be estimated in more finer steps.

For example, in FIG. 16, using pixels A, C, G, and I which are obliquely adjacent to the pixel E of interest, as peripheral pixels of the pixel E of interest, the difference between the average value of signal values of these peripheral pixels A, B, C, D, F, G, H, and I and the signal value of the pixel E of interest is calculated, and weighting values may be finely calculated as follows.

Pixel E of interest−average value of peripheral pixels>equal to or more than 105→"−8" of digital value
Pixel E of interest−average value of peripheral pixels>equal to or more than 90 and less than 105→"−7" of digital value
Pixel E of interest−average value of peripheral pixels>equal to or more than 75 and less than 90→"−6" of digital value
Pixel E of interest−average value of peripheral pixels>equal to or more than 60 and less than 75→"−5" of digital value
Pixel E of interest−average value of peripheral pixels>equal to or more than 45 and less than 60→"−4" of digital value
Pixel E of interest−average value of peripheral pixels>equal to or more than 30 and less than 45→"−3" of digital value
Pixel E of interest−average value of peripheral pixels>equal to or more than 15 and less than 30→"−2" of digital value
Pixel E of interest−average value of peripheral pixels>equal to or more than 10 and less than 15→"−1" of digital value
Pixel E of interest−average value of peripheral pixels>equal to or more than 0 and less than 10→"±0" of digital value In addition, when a magnitude relationship is reversed, a portion of the above minus (−) process becomes a plus (+) process. In addition, a condition and processing method of the threshold values may be arbitrarily set.

Since the weighting may be performed based on the signal values of the larger number of peripheral pixels than those in Example 1 as the pixels associated with the pixel of interest by the weighting process related to Example 2, unnatural gradation having steps corresponding to a magnification ratio difference in accumulation times between the short time accumulation pixel and the long time accumulation pixel may be more alleviated.

2-3. Example 3

In the weighting process related to Examples 1 and 2, the weighting is performed using signal values of the peripheral pixels of the pixel of interest, that is, the adjacent pixels as it is. On the other hand, in the weighting process related to Example 3, for example, the weighting may be performed from a tendency of, for example, adjacent pixels before and after the pixel of interest.

Specifically, from the tendency of the adjacent pixels before and after the pixel of interest, that is, a tendency (inclination) of the difference of the amount of change in the signal value of the adjacent pixel, the signal value of the adjacent pixel is estimated, and the weighting is performed using the estimation value. To see the tendency of the adjacent pixels before and after the pixel of interest, output values (signal values) of a plurality of pixels which are coordinately consecutive with respect to the adjacent pixels before and after the pixel of interest, for example, output values of a plurality of pixels which are consecutive in a row direction may be used.

Figure 17A:
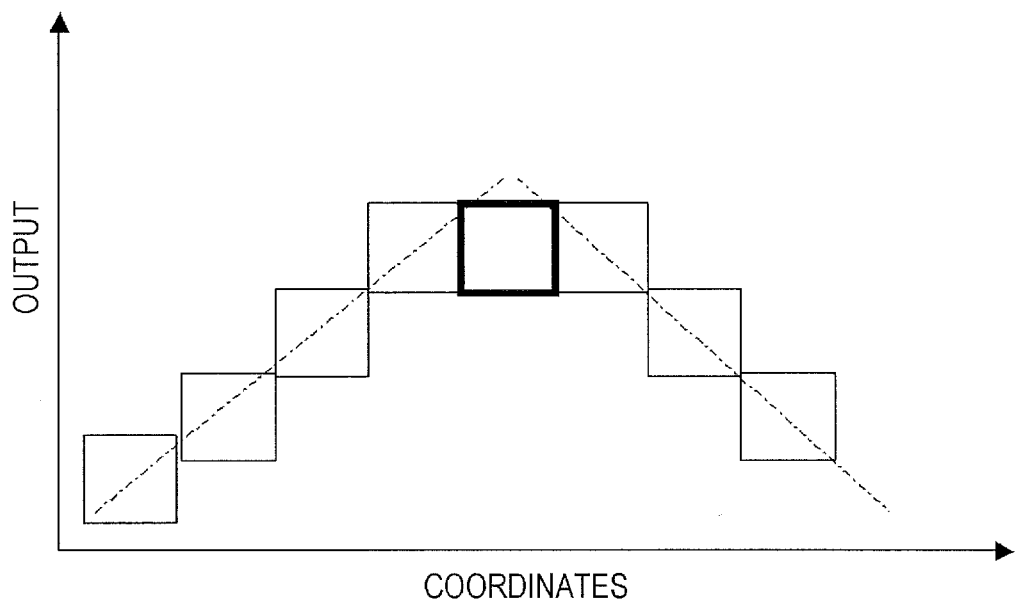
FIGS. 17A and 17B are drawings for describing weighting due to an inclination change in a weighting process according to Example 3 of the present disclosure.
Figure 17B:
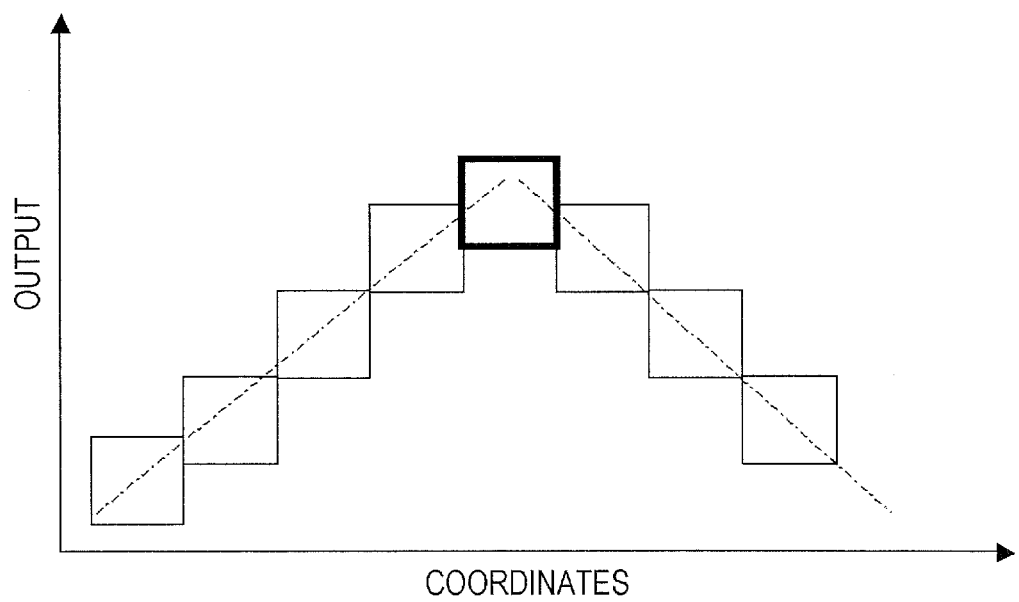

More specific description will be made with reference to FIGS. 17A and 17B. FIG. 17A shows an output value (signal value) of a pixel in each coordinates before the weighting, and FIG. 17B shows an output value of a pixel in each coordinates after the weighting. In FIG. 17A, when the pixel of interest is a thick frame pixel, the same output value as that when seeing only the adjacent pixel is obtained, and therefore the signal value of the pixel of interest is not subjected to the weighting.

However, when seeing the tendency of the adjacent pixels before and after the pixel of interest, that is, the tendency (inclination) of the difference of the amount of change in the adjacent pixels, the signal value of the pixel of interest which is higher than the signal value of the adjacent pixel is natural may be readily estimated. Accordingly, the signal value of the adjacent pixel is estimated from the tendency of the adjacent pixels before and after the pixel of interest, and the weighting is performed with respect to the signal value of the pixel of interest using the estimation value, and therefore the signal value of the pixel of interest becomes higher than the signal value of the adjacent pixel as shown in FIG. 17B. In this instance, the weighting is performed within the magnification ratio difference of the accumulation times, similar to the cases of Examples 1 and 2.

In this manner, even when the weighting is performed from the tendency (in the present example, the tendency of the adjacent pixels before and after the pixel of interest) of the pixels associated with the pixel of interest, unnatural gradation having steps of a magnification ratio difference of accumulation times between the short time accumulation pixel and the long time accumulation pixel is alleviated, similar to the cases of Examples 1 and 2. As a result, image representation with higher gradability may be realized.

2-4. Example 4

In the weighting process related to Examples 1 to 3, the weighting is performed with respect to the pixel of interest using the signal value of the peripheral pixel of the pixel of interest, which is positionally or coordinately different from the pixel of interest. On the other hand, in the weighting process related to Example 4, the weighting is performed with respect to the pixel of interest using a signal value of a pixel with the same coordinates as those of the pixel of interest, which is temporally different from the pixel of interest.

Here, the "pixel with the same coordinates which is temporally different from the pixel of interest" is a pixel (positionally (coordinately) the same pixel) with the same coordinates (the same position) as those of the pixel of interest in an imaging frame which is different from that of the pixel of interest, as described above. Accordingly, in the weighting process related to Example 4, the weighting is performed from a temporal change in the signal value of the pixel with the same coordinates.

Figure 18A:
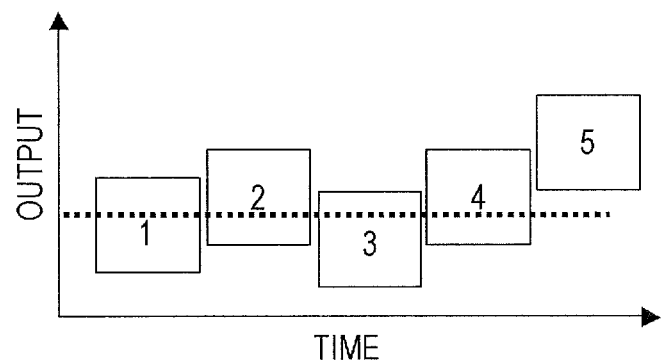
FIGS. 18A and 18B are drawings for describing weighting due to a temporal change in a weighting process according to Example 4 of the present disclosure.
Figure 18B:
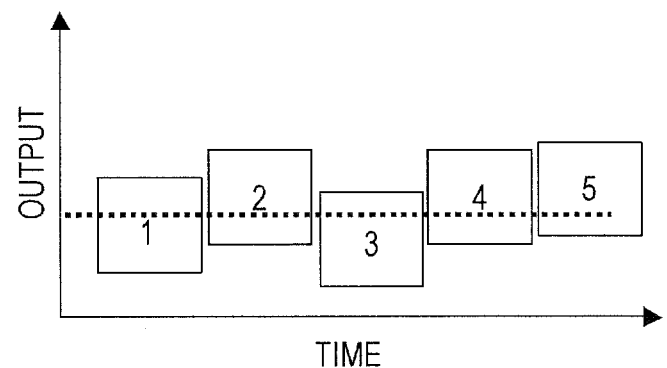

The weighting process related to Example 4 will be described in more detail with reference to FIGS. 18A and 18B showing a temporal change of the pixel with the same coordinates. FIG. 18A shows a state of five pixels 1 to 5 in five consecutive imaging frames before weighting, and FIG. 18B shows a state of the five pixels 1 to 5 after weighting. That is, in FIGS. 18A and 18B, numerals of the pixels 1 to 5 show an order of the imaging frames for the pixels with the same coordinates.

Here, in FIGS. 18A and 18B, the pixel 5 is used as a pixel of interest. When weighting is performed with respect to the pixel 5 of interest, the following process is performed with reference to each output value (signal value) of the pixels 1 to 4 of a time axis (frame) before performing the weighting. In this case, signal value data of different times (frame) is stored in the memory unit 42 of FIG. 1.

Process with Respect to Pixel 5 of Interest
When average (intermediate value) of pixels 1 to 4 is smaller than signal value of pixel 5: signal value of pixel 5−4 digital value
When average (intermediate value) of pixels 1 to 4 is greater than signal value of pixel 5: signal value of pixel 5+4 digital value
When average (intermediate value) of pixels 1 to 4 is the same as pixel 5: no weighting In a case of Example of FIGS. 18A and 18B, an average value of signal values of the pixels 1 to 4 are indicated by a dotted line. The signal value of the pixel 5 is larger than the average value. Accordingly, in this case, a first process among the processes determined as above, that is, a process of subtracting "4" of the digital value from the signal value of the pixel 5 is performed.

In this manner, even when the weighting is performed using the signal value of the pixel with the same coordinates as those of the pixel of interest, which is temporally different from the pixel of interest, unnatural gradation having steps of a magnification ratio difference of accumulation times between the short time accumulation pixel and the long time accumulation pixel may be alleviated. As a result, image representation with higher gradability may be realized.

2-5. Specific Circuit Example of Weighting Unit

Figure 19:
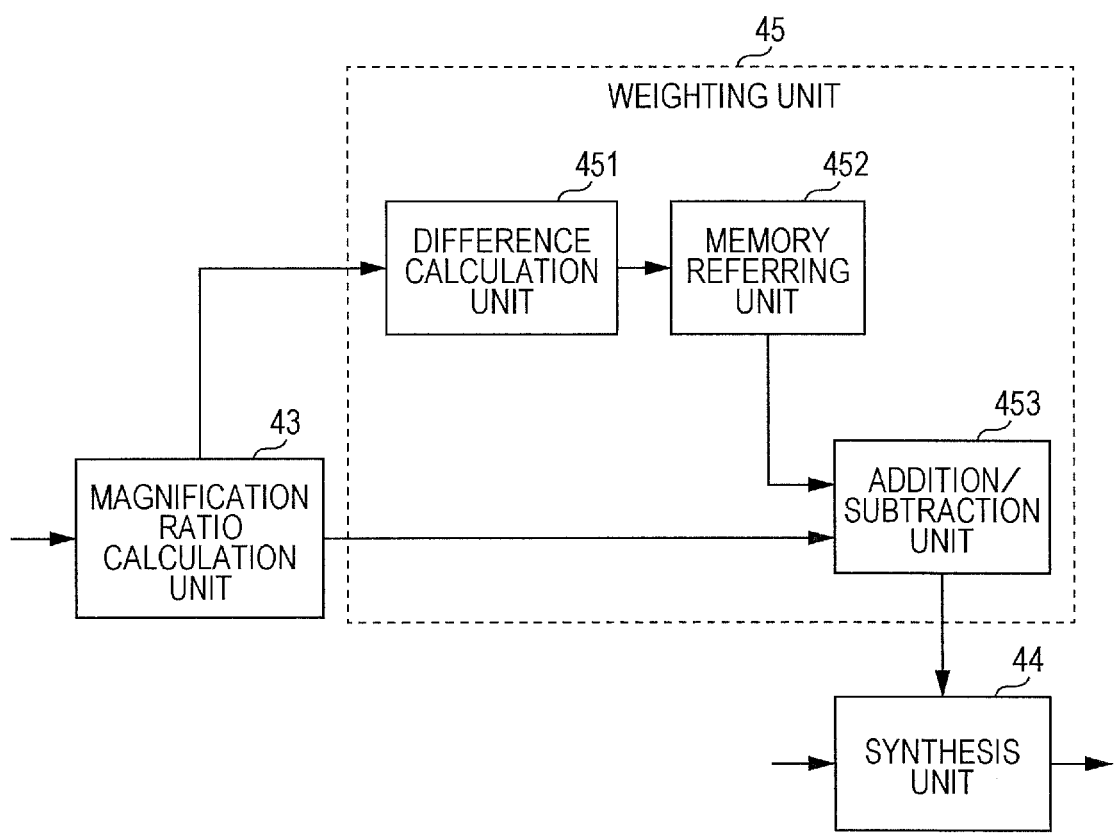
FIG. 19 is a block diagram showing a specific circuit example whether a weight unit is present.

Next, a circuit configuration of the weighting unit 45 for performing the weighting related to Examples 1 to 4 will be described with reference to FIG. 19 showing the specific circuit example.

As shown in FIG. 19, the weighting unit 45 related to the present Example includes a difference calculation unit 451, a memory referring unit 452, and an addition/subtraction unit 453.

The difference calculation unit 451 calculates a difference between a signal value of a pixel associated with the pixel of interest and a signal value of the pixel of interest. The memory referring unit 452 stores in advance a plurality of weighting values corresponding to the difference between the signal value of the pixel associated with the pixel of interest and the signal value of the pixel of interest. The addition/subtraction unit 453 acquires, from the memory referring unit 452, a weighting value corresponding to the difference calculated in the difference calculation unit 451, and adds or subtracts the acquired weighting value to or from the signal value of the pixel of interest.

Here, the weighting process performed by the weighting unit 45 of the above-described configuration will be described. In performing the weighting process related to Examples 1 to 4 described above, the signal value of the short time accumulation pixel is multiplied by a magnification ratio difference α of the accumulation times between the short time accumulation pixel and the long time accumulation pixel in the magnification ratio calculation unit 43 in the previous stage of the weighting unit 45. Pixel data of the short time accumulation pixel which has been multiplied by α times may be given to the difference calculation unit 451 and the addition/subtraction unit 453.

The difference calculation unit 451 compares the signal value of the pixel associated with the pixel of interest and the signal value of the pixel of interest, and calculates the difference therebetween. The difference may be given to the memory referring unit 452. In the memory referring unit 452, information as to which weighting process is performed to correspond to a variety of differences at the time of each difference, that is, the weighting value corresponding to the variety of differences is stored. Accordingly, a predetermined weighting value corresponding to the difference calculated by the difference calculation unit 451 is output from the memory referring unit 452.

The weighting value output from the memory referring unit 452 may be given to the addition/subtraction unit 453. The addition/subtraction unit 453 adds or subtracts the weighting value obtained by referring to the memory referring unit 452, to or from the short time accumulation data after the magnification ratio calculation performed in the magnification ratio calculation unit 43.

In addition, here, the detailed description of the long time accumulation pixel has been made, but in general, in the process for the realization of the wide dynamic range, data of the long time accumulation pixel is used in a dark portion and data of the short time accumulation pixel is used in a bright portion.

2-6. Arrangement Example of Each Pixel of Long Time Accumulation/Short Time Accumulation

Pixel Arrangement Example 1

Figure 20:
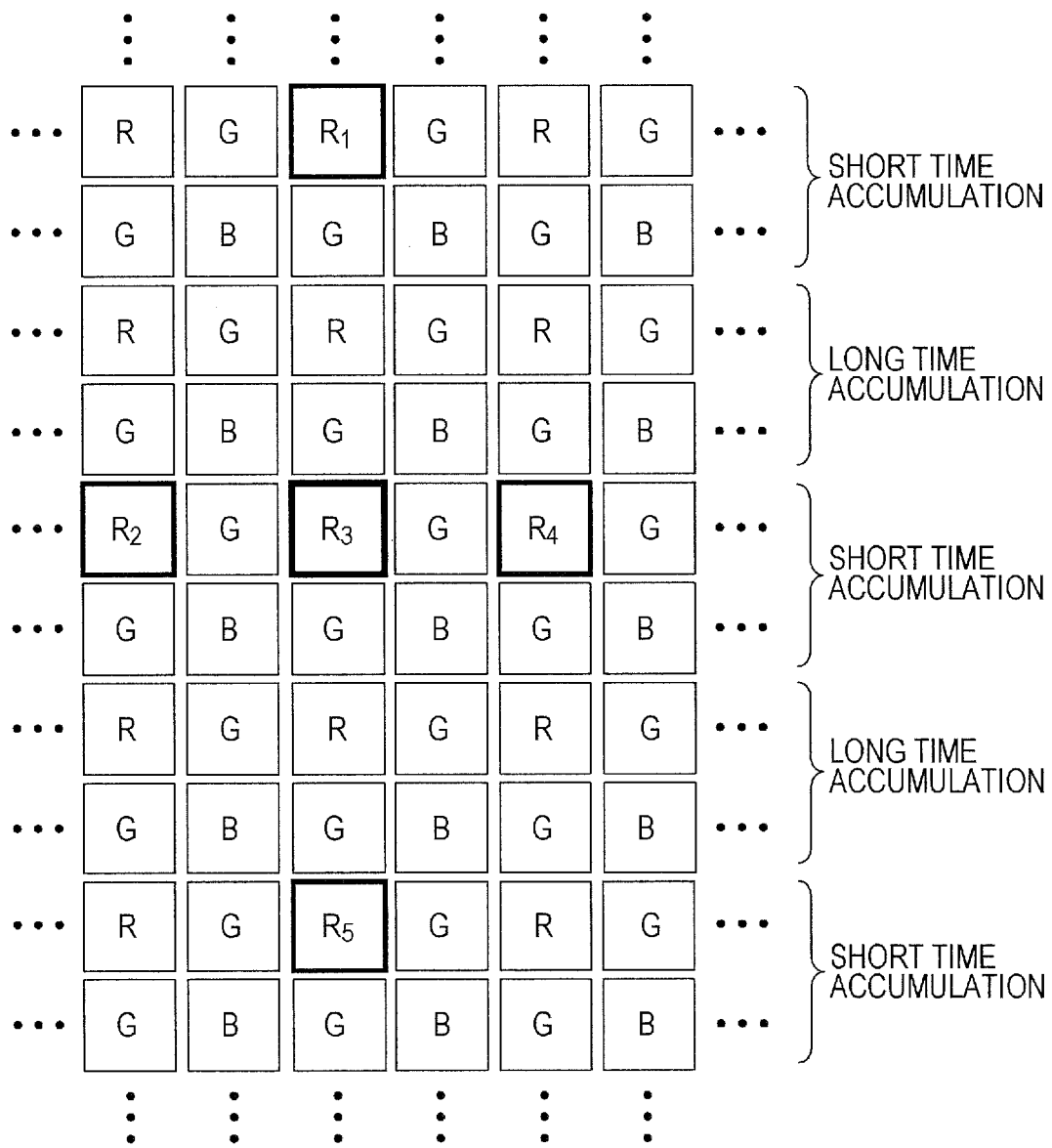
FIG. 20 is a drawing showing an example of a disposition relation of each pixel of long time accumulation/short time accumulation in a pixel array in a case of an SVE scheme.

As one technology for realizing a wide dynamic range, wide dynamic range imaging technology of a Spatially Varying Exposure (SVE) scheme has been known (for example, see Japanese Unexamined Patent Application Publication No. 2007-135200). An example of a pixel array in a case of the SVE scheme is shown in FIG. 20. In the pixel array of FIG. 20, the short time accumulation pixels and the long time accumulation pixels are arranged for each two rows.

In this manner, in the pixel array obtained such that the short time accumulation pixels and the long time accumulation pixels are arranged for each two rows, the relationship between the pixel of interest and the peripheral pixels will be described using an example in which the weighting process related to, for example, Example 2 is performed.

In FIG. 20, when a pixel of $R_3$ of short time accumulation is used as the pixel of interest, each peripheral pixel $R_1$, $R_2$, $R_4$, and $R_5$ which are the same short time accumulation pixels and are pixels with the same color is used as the peripheral pixels, and the weighting may be performed with respect to the signal value of the pixel $R_3$ of interest based on each signal value of the pixels $R_1$, $R_2$, $R_4$, and $R_5$.

In this case, since a distance from the pixel $R_3$ of interest to the pixels $R_1$ and $R_5$ is twice the distance from the pixel $R_3$ of interest to the pixels $R_2$ and $R_4$, a weighting of twice may be performed with respect to the signal values of the pixels $R_2$ and $R_4$.

For example, it is assumed that the signal value of the pixel $R_3$ of interest is "50", an average value of the pixels $R_1$ and $R_5$ is "40", and an average value of the pixels $R_2$ and $R_4$ is "60". In this instance, when the weighting is not performed with respect to the signal values of the pixels $R_2$ and $R_4$, an average value of the pixels $R_1$, $R_2$, $R_4$, and $R_5$ is "50" that is the same as the signal value of the pixel $R_3$ of interest, and therefore the weighting may not be performed with respect to the signal value of the pixel $R_3$ of interest (however, when the weighting value is determined by comparing the average value of the peripheral pixels and the signal value of the pixel of interest).

However, as described above, since the distance from the pixel $R_3$ of interest to the pixels $R_1$ and $R_5$ is twice the distance from the pixel $R_3$ of interest to the pixels $R_2$ and $R_4$, the weighting of twice is performed with respect to the signal value of the pixels $R_2$ and $R_4$. Therefore, the average value of the peripheral pixels=(40+60×2)/3=53 is satisfied, and the average value of the peripheral pixels becomes larger than the signal value of the pixel $R_3$ of interest. In this case, as described above, a weighting of adding a desired value to the signal value of the pixel $R_3$ of interest within a magnification ratio difference of accumulation times may be performed.

Pixel Arrangement Example 2

Figure 21:
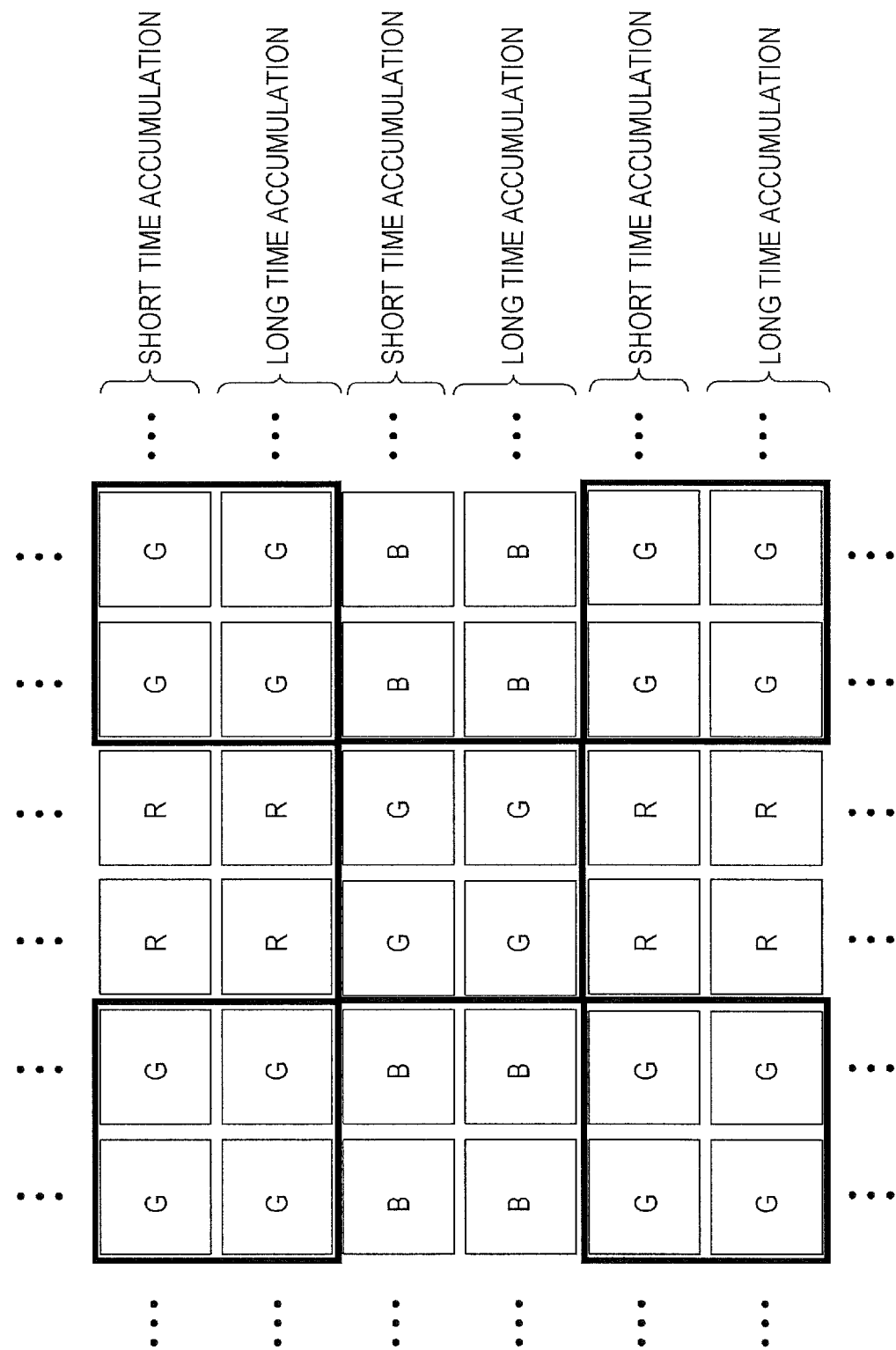
FIG. 21 is a drawing showing an example of a disposition relation of each pixel of long time accumulation/short time accumulation in a pixel array in a case of a pixel division scheme.

As another one of technologies for realizing a wide dynamic range, a wide dynamic range imaging technology in which a single pixel is divided into a plurality of sub-pixels having different charge accumulation times has been known (for example, see Japanese Unexamined Patent Application Publication No. 2010-28423). An example of a pixel arrangement in a case of this pixel division scheme is shown in FIG. 21. In the pixel arrangement of FIG. 21, by portraying four division, that is, four sub-pixels as a single pixel, two sub-pixels on an upper level are used as the short time accumulation pixel and two sub-pixels on a lower level are used as the long time accumulation pixel.

In this manner, in a pixel arrangement obtained in such a manner that a unit pixel which has been divided into the four sub-pixels having different accumulation times is two-dimensionally arranged in a matrix form, a relationship between the pixel of interest and the peripheral pixel when performing the weighting process related to Example 2 will be described. However, four adjacent pixels which are vertically and laterally adjacent to the pixel of interest are used as the peripheral pixels in Example 2, whereas four adjacent pixels which are obliquely adjacent to the pixel of interest are used as the peripheral pixels in the present example.

That is, in the present example, when a green pixel surrounded by a thick frame of a central portion of FIG. 21 is used as the pixel of interest, four green pixels which are obliquely adjacent to the pixel of interest and surrounded by a thick peripheral frame are used as the peripheral pixels to thereby perform the weighting.

In the wide dynamic range imaging technology in the scheme in which a single pixel is divided into a plurality of sub-pixels having different accumulation times, a signal value of a short time accumulation sub-pixel and a signal value of a long time accumulation sub-pixel are read out individually. Accordingly, in the above-described weighting process, a signal value of a pixel actually used becomes a signal value of a short time accumulation pixel on the upper side of each thick frame portion of FIG. 21.

3. Modification Example/Application Example

A configuration in which a circuit portion in which the noise reduction process (smoothing) described above is performed is disposed on a signal processing path on a rear side of the weighting unit 45 according to the present embodiment may be adopted. By adopting the above-described configuration, an original signal level used in the noise reduction process becomes a digital value represented with more accurate gradation by the action of the weighting unit 45 according to the present embodiment, and therefore the noise reduction process may be more accurately performed.

In addition, in the above embodiment, an example in which the charge accumulation times between the first pixel group and the second pixel group are different from each other by α times has been described, but even when the photosensitivity is different by α times, that is, even when a sensitivity difference of α times corresponding to an accumulation time difference of a times is given between the pixels, the same action and effect may be obtained. As a technology in which photosensitivity differs between pixels, a technology (for example, see Japanese Unexamined Patent Application Publication No. 2010-28423) in which light transmittance of an optical attenuation film disposed on a color filter differs between pixels may be used.

In addition, in the above embodiment, in the realization of the wide dynamic range, the charge accumulation time is set as two types of the long accumulation time and the short accumulation time, but the present technology is not limited to two types of accumulation time, and may also be applied to a case in which the charge accumulation time is set as at least three types of accumulation time. The photosensitivity is also the same as that in the accumulation time.

In addition, in FIGS. 20 and 21, a Bayer array of R, G, and B as a color array of a color filter has been described, but the present technology is not limited to application to the solid-state imaging element using the color filter of the Bayer array of R, G, and B. For example, the present technology may be equally applied to a solid-state imaging element using a clear bit array, a dye-based color filter, or the like. In addition, the present technology may be equally applied to a solid-state imaging element having a vertical spectral structure (for example, see Japanese Unexamined Patent Application Publication No. 2010-28423) in which photodiode within the same pixel is constituted of three stages in the longitudinal direction, and a plurality of color signals are obtained from the same pixel.

4. Configuration of Present Disclosure

In addition, the present disclosure may be adopted the following configurations.

(1) A signal processing circuit of a solid-state imaging element which processes a signal of the solid-state imaging element having a first pixel group and a second pixel group in which a charge accumulation time or photosensitivity is different by α times from that of the first pixel group, the signal processing circuit including: a calculation unit that multiplies a signal value of a pixel of interest in the first pixel group by α times; a weighting unit that performs weighting with respect to the signal value of the pixel of interest based on a signal value of a pixel associated with the pixel of interest; and a synthesis unit that synthesizes the signal value which has been multiplied by α times in the calculation unit and on which the weighting has been performed in the weighting unit and a signal value of a pixel of the second pixel group.

(2) The signal processing circuit described in (1), wherein the pixel associated with the pixel of interest is a peripheral pixel of the pixel of interest, which is positionally different from the pixel of interest.

(3) The signal processing circuit described in (2), wherein the peripheral pixel is a pixel adjacent to the pixel of interest.

(4) The signal processing circuit described in (3), wherein the peripheral pixel is a plurality of pixels which are coordinately consecutive with respect to the pixel adjacent to the pixel of interest.

(5) The signal processing circuit described in (4), wherein the weighting unit estimates a signal value of the pixel adjacent to the pixel of interest based on signal values of the plurality of pixels, and performs the weighting using the estimated value.

(6) The signal processing circuit described in (1), wherein the pixel associated with the pixel of interest is a pixel with the same coordinates as those of the pixel of interest, which is temporally different from the pixel of interest.

(7) The signal processing circuit described in any one of (1) to (6), wherein the pixel associated with the pixel of interest is a pixel with the same color as that of the pixel of interest.

(8) The signal processing circuit described in any one of (1) to (7), wherein the weighting unit performs the weighting by a weighting value within a range of $\pm(\alpha/2)$.

(9) The signal processing circuit described in (8), wherein the weighting unit performs the weighting by a weighting value of $\pm(\alpha/4)$.

(10) The signal processing circuit described in (8), wherein the weighting unit compares the signal value of the pixel of interest and a signal value of the pixel associated with the pixel of interest, and adds or subtracts the weighting value to or from the signal value of the pixel of interest within the range of $\pm(\alpha/2)$ based on the comparison result.

(11) The signal processing circuit described in (10), wherein the weighting unit performs addition when the signal value of the pixel associated with the pixel of interest is greater than the signal value of the pixel of interest, and performs subtraction when the signal value of the pixel associated with the pixel of interest is smaller than the signal value of the pixel of interest.

(12) The signal processing circuit described in (10), wherein when the pixel associated with the pixel of interest is a plurality of peripheral pixels which are positionally different from the pixel of interest, the weighting unit compares the signal value of the pixel of interest and an average value of the plurality of peripheral pixels.

(13) The signal processing circuit described in (8), wherein the weighting unit sets a plurality of threshold values with respect to a difference between the signal value of the pixel of interest and the signal value of the pixel associated with the pixel of interest, and adds to or subtracts from the signal value of the pixel of interest, weighting values different for each of a plurality of threshold values.

(14) The signal processing circuit described in any one of (1) to (13), wherein the weighting unit includes a difference calculation unit that calculates a difference between the signal value of the pixel associated with the pixel of interest and the signal value of the pixel of interest, a memory unit that stores in advance a plurality of weighting values corresponding to the difference between the signal value of the pixel associated with the pixel of interest and the signal value of the pixel of interest, and an addition/subtraction unit that obtains, from the memory unit, the weighting value corresponding to the difference obtained by the difference calculation unit, and adds or subtracts the obtained weighting value to or from the signal value of the pixel of interest.

(15) A signal processing method of a solid-state imaging element which processes a signal of the solid-state imaging element having a first pixel group and a second pixel group in which a charge accumulation time or photosensitivity is different by $\alpha$ times with respect to the first pixel group, the signal processing method including: multiplying a signal value of a pixel of interest in the first pixel group by $\alpha$ times; and performing weighting with respect to the signal value of the pixel of interest based on a signal value of a pixel associated with the pixel of interest when synthesizing the signal value of the pixel of interest and a signal value of a pixel of the second pixel group.

(16) An electronic apparatus having a signal processing circuit that includes a solid-state imaging element having a first pixel group and a second pixel group in which a charge accumulation time or photosensitivity is different by $\alpha$ times with respect to the first pixel group, a calculation unit that multiplies a signal value of a pixel of interest in the first pixel group by $\alpha$ times, a weighting unit that performs weighting with respect to the signal value of the pixel of interest based on a signal value of a pixel associated with the pixel of interest, and a synthesis unit that synthesizes the signal value which has been multiplied by $\alpha$ times in the calculation unit and on which the weighting has been performed in the weighting unit and a signal value of a pixel of the second pixel group.

The present disclosure contains subject matter related to that disclosed in Japanese Priority Patent Application JP 2011-257335 filed in the Japan Patent Office on Nov. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing circuit of a solid-state imaging element, the signal processing circuit comprising:
    a calculation unit that multiplies a signal value of a pixel of interest in a first pixel group of the solid-state imaging element by a times;
    a weighting unit that performs weighting with respect to the signal value of the pixel of interest based on a signal value of a pixel associated with the pixel of interest, wherein the weighing unit performs the weighting by a weighing value within a range of $\pm(\alpha/2)$; and
    a synthesis unit that synthesizes the signal value which has been multiplied by a times in the calculation unit and on which the weighting has been performed in the weighting unit and a signal value of a pixel of a second pixel group of the solid-state imaging element, wherein a charge accumulation time or photosensitivity of the second pixel group is different by $\alpha$ times from the charge accumulation time or photosensitivity of the first pixel group.

2. The signal processing circuit according to claim 1, wherein the pixel associated with the pixel of interest is a peripheral pixel of the pixel of interest, which is positionally different from the pixel of interest.

3. The signal processing circuit according to claim 2, wherein the peripheral pixel is a pixel adjacent to the pixel of interest.

4. The signal processing circuit according to claim 3, wherein the peripheral pixel is a plurality of pixels which are coordinately consecutive with respect to the pixel adjacent to the pixel of interest.

5. The signal processing circuit according to claim 4, wherein the weighting unit estimates a signal value of the pixel adjacent to the pixel of interest based on signal values of the plurality of pixels, and performs the weighting using the estimated value.

6. The signal processing circuit according to claim 1, wherein the pixel associated with the pixel of interest is a pixel with the same coordinates as those of the pixel of interest, which is temporally different from the pixel of interest.

7. The signal processing circuit according to claim 1, wherein the pixel associated with the pixel of interest is a pixel with the same color as that of the pixel of interest.

8. The signal processing circuit according to claim 1, wherein the weighting unit performs the weighting by a weighting value of $\pm(\alpha/4)$.

9. The signal processing circuit according to claim 1, wherein the weighting unit compares the signal value of the pixel of interest and a signal value of the pixel associated with the pixel of interest, and adds or subtracts the weighting value to or from the signal value of the pixel of interest within the range of $\pm(\alpha/2)$ based on a result of the comparison.

10. The signal processing circuit according to claim 9, wherein the weighting unit performs addition when the signal value of the pixel associated with the pixel of interest is greater than the signal value of the pixel of interest, and performs subtraction when the signal value of the pixel associated with the pixel of interest is smaller than the signal value of the pixel of interest.

11. The signal processing circuit according to claim 9, wherein when the pixel associated with the pixel of interest is a plurality of peripheral pixels which are positionally different from the pixel of interest, the weighting unit compares the signal value of the pixel of interest and an average value of the plurality of peripheral pixels.

12. The signal processing circuit according to claim 1, wherein the weighting unit sets a plurality of threshold values with respect to a difference between the signal value of the pixel of interest and the signal value of the pixel associated with the pixel of interest, and adds or subtracts, to or from the signal value of the pixel of interest, weighting values different for each of the plurality of threshold values.

13. The signal processing circuit according to claim 1, wherein the weighting unit includes a difference calculation unit that calculates a difference between the signal value of the pixel associated with the pixel of interest and the signal value of the pixel of interest, a memory unit that stores in advance a plurality of weighting values corresponding to the difference between the signal value of the pixel associated with the pixel of interest and the signal value of the pixel of interest, and an addition/subtraction unit that obtains, from the memory unit, the weighting value corresponding to the difference obtained by the difference calculation unit, and adds or subtracts the obtained weighting value to or from the signal value of the pixel of interest.

14. A signal processing method of a solid-state imaging element, the signal processing method comprising:

multiplying a signal value of a pixel of interest in a first pixel group of the solid-state imaging element by $\alpha$ times; and performing weighting with respect to the signal value of the pixel of interest based on a signal value of a pixel associated with the pixel of interest when synthesizing the signal value of the pixel of interest and a signal value of a pixel of a second pixel group of the solid-state imaging element, wherein the weighting is performed by a weighing value within a range of $\pm(\alpha/2)$, wherein a charge accumulation time or photosensitivity of the second pixel croup is different by $\alpha$ times from the charge accumulation time or photosensitivity of the first pixel group.

15. An electronic apparatus having a signal processing circuit that comprises:

a solid-state imaging element having a first pixel group and a second pixel group in which a charge accumulation time or photosensitivity is different by $\alpha$ times with respect to the first pixel group;

a calculation unit that multiplies a signal value of a pixel of interest in the first pixel group by $\alpha$ times;

a weighting unit that performs weighting with respect to the signal value of the pixel of interest based on a signal value of a pixel associated with the pixel of interest, wherein the weighing unit performs the weighting by a weighing value within a range of $\pm(\alpha/2)$; and a synthesis unit that synthesizes the signal value which has been multiplied by $\alpha$ times in the calculation unit and on which the weighting has been performed in the weighting unit and a signal value of a pixel of the second pixel group.

* * * * *